US012658801B2

(12) United States Patent
Tsuruyama et al.

(10) Patent No.: US 12,658,801 B2
(45) Date of Patent: Jun. 16, 2026

---

(54) SWITCHING POWER SUPPLY DEVICE, SWITCH CONTROL DEVICE, VEHICLE-MOUNTED APPLIANCE, AND VEHICLE

(71) Applicant: ROHM CO., LTD., Kyoto (JP)

(72) Inventors: Genki Tsuruyama, Kyoto (JP); Isao Takobe, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 205 days.

(21) Appl. No.: 18/678,507

(22) Filed: May 30, 2024

(65) Prior Publication Data

US 2024/0313652 A1 Sep. 19, 2024

Related U.S. Application Data

(63) Continuation of application No. PCT/JP2022/038736, filed on Oct. 18, 2022.

(30) Foreign Application Priority Data

Dec. 3, 2021 (JP) ................................. 2021-197256

(51) Int. Cl.
*H02M 3/158* (2006.01)
*H02M 1/00* (2006.01)
*H02M 1/08* (2006.01)

(52) U.S. Cl.
CPC ......... *H02M 3/158* (2013.01); *H02M 1/0048* (2021.05); *H02M 1/083* (2013.01)

(58) Field of Classification Search
CPC ..... H02M 3/158; H02M 1/0048; H02M 1/083
See application file for complete search history.

(56) References Cited

U.S. PATENT DOCUMENTS

| | | | | |
|---|---|---|---|---|
| 6,271,651 B1* | 8/2001 | Stratakos | ............... | H02M 3/158 |
| | | | | 323/282 |
| 7,652,457 B2* | 1/2010 | Xi | ......................... | H02M 3/158 |
| | | | | 323/283 |
| 7,786,715 B2* | 8/2010 | Woo | ......................... | H02M 1/34 |
| | | | | 323/288 |
| 8,779,745 B2* | 7/2014 | Brown | .............. | H02M 3/33569 |
| | | | | 323/285 |
| 9,178,420 B1* | 11/2015 | Hawley | ................. | H02M 3/158 |

(Continued)

FOREIGN PATENT DOCUMENTS

JP          2010-035316 A          2/2010

OTHER PUBLICATIONS

International Search Report and Written Opinion in International Appln. No. PCT/JP2022/038736, mailed on Dec. 27, 2022, 13 pages (with machine translation).

*Primary Examiner* — Rafael O De Leon Domenech
(74) *Attorney, Agent, or Firm* — Fish & Richardson P.C.

(57) ABSTRACT

In the switching power supply device, a controller has a first state in which it keeps a first switch on and a second switch off, a second state in which it keeps the first switch off and the second switch on, a third state in which it keeps the first and second switches off, and a fourth state in which it keeps a voltage at a connection node between the first and second switches lower than in the third state. The controller repeats the first, second, third, and fourth states on a basis of a periodic signal, and masks the periodic signal until detecting a zero-crossing point of a current flowing through an inductor.

17 Claims, 35 Drawing Sheets

(56)         References Cited

U.S. PATENT DOCUMENTS

| | | | | |
|---|---|---|---|---|
| 9,356,517 B1 * | 5/2016 | Ihs | ......................... | H02M 3/158 |
| 9,762,124 B2 * | 9/2017 | Ihs | .......................... | H02M 1/32 |
| 2015/0194882 A1 * | 7/2015 | Ihs | ......................... | H02M 3/156 |
| | | | | 323/272 |
| 2017/0182894 A1 * | 6/2017 | Yamaguchi | ......... | H02M 3/1582 |

* cited by examiner

SWITCHING POWER SUPPLY DEVICE, SWITCH CONTROL DEVICE, VEHICLE-MOUNTED APPLIANCE, AND VEHICLE

CROSS-REFERENCE TO RELATED APPLICATIONS

This nonprovisional application is a continuation application of International Patent Application No. PCT/JP2022/038736 filed on Oct. 18, 2022, which claims priority to Japanese Patent Application No. 2021-197256 filed in Japan on Dec. 3, 2021, the entire contents of which are hereby incorporated by reference.

BACKGROUND OF THE INVENTION

1. Technical Field

The invention disclosed herein relates to switching power supply devices that buck an input voltage to produce an output voltage, as well as to switch control devices, vehicle-mounted appliances, and vehicles.

2. Description of Related Art

As switching power supply devices with high efficiency under light loads, switching power supply devices of a fixed-on-time control method are conventionally known (see, for example, JP 2010-35316).

DESCRIPTION OF EMBODIMENTS

In the present description, a MOS transistor denotes a transistor with a gate structure comprising at least the following three layers: a "layer of a conductive material or of a semiconductor with a low resistance value such as polysilicon"; an "insulating layer"; and a "layer of a p-type, n-type, or intrinsic semiconductor". That is, the gate structure of a MOS transistor is not limited to a three-layer structure comprising a metal, an oxide, and a semiconductor.

In the present description, a reference voltage denotes a voltage which keeps constant under an ideal state, and yet actually which is slightly variable due to temperature changes or the like.

In the present description, a constant voltage denotes a voltage which keeps constant under an ideal state, and yet actually which is slightly variable due to temperature changes or the like.

In the present description, a constant current denotes a current which keeps constant under an ideal state, and yet actually which is slightly variable due to temperature changes or the like.

First Embodiment

Figure 1:
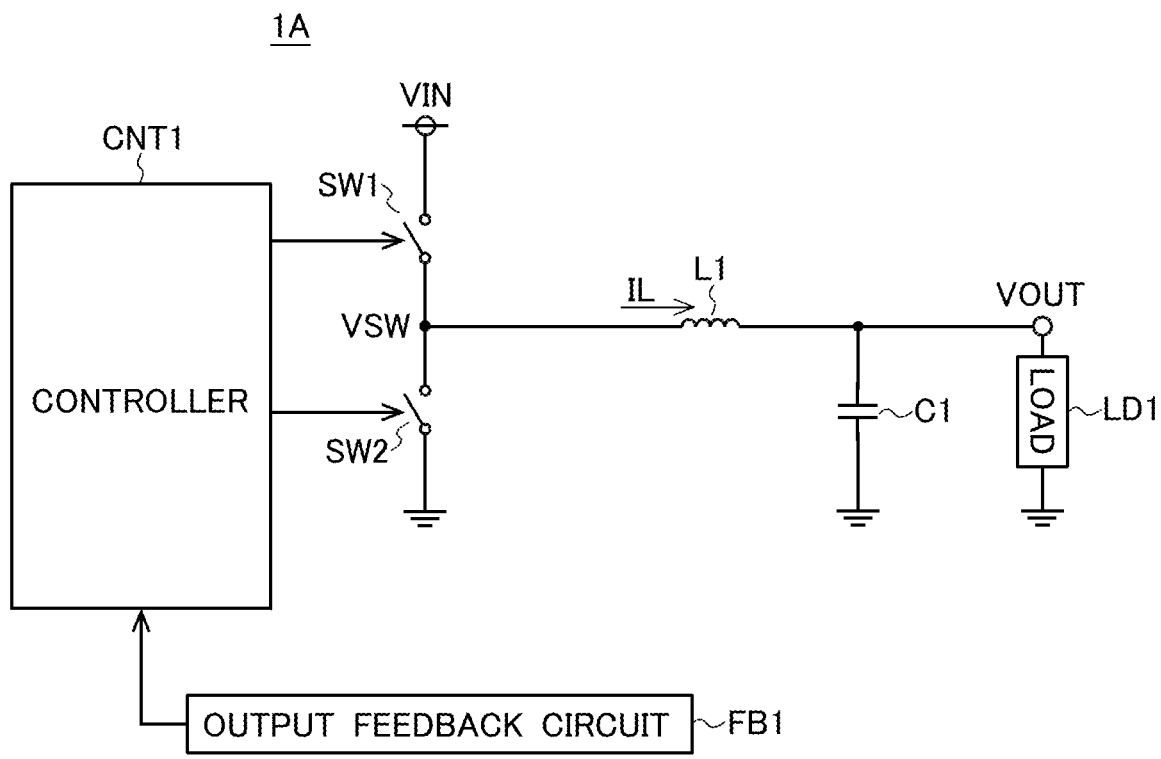
FIG. 1 is a diagram showing a configuration of a switching power supply device according to a first embodiment.

FIG. 1 is a diagram showing a configuration of a switching power supply device according to a first embodiment. The switching power supply device 1A according to the first embodiment (hereinafter "switching power supply device 1A") is a switching power supply device that bucks (steps down) an input voltage VIN to produce an output voltage VOUT. The switching power supply device 1A includes a controller CNT1, a first switch SW1, a second switch SW2, an inductor L1, an output capacitor C1, and an output feedback circuit FB1. The switching power supply device 1A may be configured to operate in a continuous current mode under a light load, or may be configured to include a reverse current prevention function and operate in a discontinuous current mode under a light load.

The controller CNT1 turns on and off the first and second switches SW1 and SW2 based on the output of the output feedback circuit FB1. In other words, the controller CNT1 is a switch control device that turns on and off the first and second switches SW1 and SW2.

The first switch SW1 has a first terminal configured to be connectable to an application terminal for the input voltage VIN, and has a second terminal configured to be connectable to the first terminal of the inductor L1. The first switch SW1 switches between a conducting state and a cut-off state the current path leading from the application terminal for the input voltage VIN to the inductor L1. The first switch SW1 can be implemented with, for example, a P-channel MOS transistor or an N-channel MOS transistor. In a case where the first switch SW1 is implemented with an N-channel MOS transistor, the switching power supply device 1A may additionally include a bootstrap circuit for generating a voltage higher than the input voltage VIN.

The second switch SW2 has a first terminal configured to be connectable to the first terminal of the inductor L1 and to the second terminal of the first switch SW1, and has a second terminal configured to be connectable to an application terminal for a ground potential. The second switch SW2 switches between a conducting state and a cut-off state the current path leading from the application terminal for the ground potential to the inductor L1. The second switch SW2 can be implemented with, for example, an N-channel MOS transistor.

Through the switching of the first and second switches SW1 and SW2, a switching voltage VSW with a pulse waveform appears at the connection node between the first and second switches SW1 and SW2. The inductor L1 and the output capacitor C1 smooth the switching voltage VSW with a pulse waveform to produce the output voltage VOUT, and supplies the output voltage VOUT to an application terminal for the output voltage VOUT. To the application terminal for the output voltage VOUT, a load LD1 is connected, so that the load LD1 is supplied with the output voltage VOUT.

The output feedback circuit FB1 generates and outputs a feedback signal commensurate with the output voltage VOUT. The output feedback circuit FB1 can be implemented with, for example, a resistor voltage division circuit that divides the output voltage VOUT with resistors to produce a feedback signal. For another example, the output feedback circuit FB1 may be configured to acquire the output voltage VOUT and outputs it as it is as a feedback signal. The output feedback circuit FB1 may be configured to generate and output, in addition to a feedback signal commensurate with the output voltage VOUT, a feedback signal commensurate with the current through the inductor L1 (hereinafter "inductor current IL"). Using an output feedback circuit FB1 that generates a feedback signal commensurate with the inductor current IL as well, it is possible to perform current-mode control.

Figure 2:
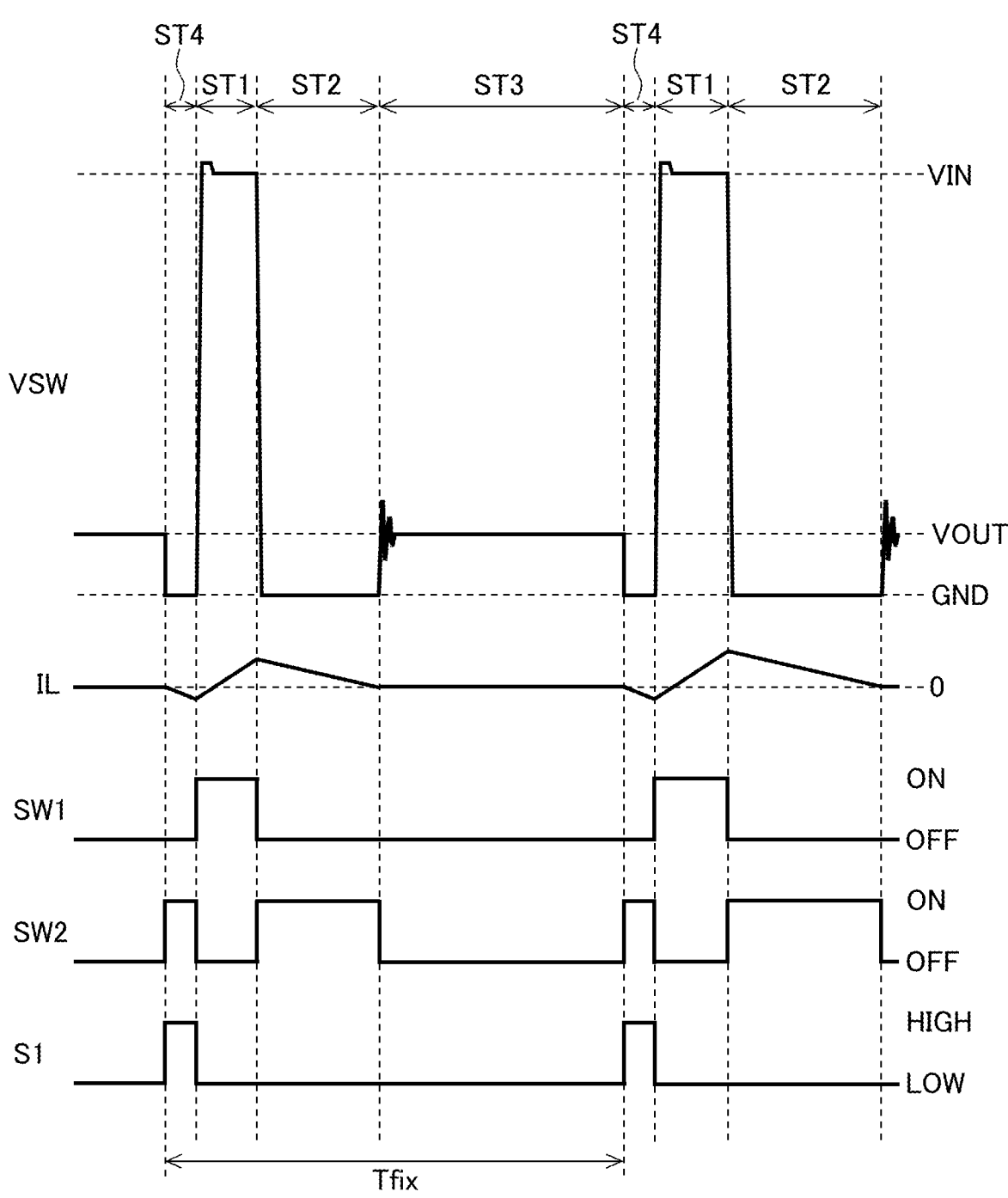
FIG. 2 is a timing chart showing the operation of the switching power supply device according to the first embodiment.

FIG. 2 is a timing chart showing the operation of the switching power supply device 1A. According to the feedback signal output from the output feedback circuit FB1, the controller CNT1 sets the length of a first state ST1. As the load LD1 is lighter, the first state ST1 is set to be shorter.

In the first state ST1, the controller CNT1 keeps the first switch SW1 on and the second switch SW2 off. In the first state ST1, the switching voltage VSW first rises to a value equal to the sum of the input voltage VIN and the forward voltage of the body diode of the first switch SW1 and then settles to a value approximately equal to the input voltage VIN. In the first state ST1, the inductor current IL increases as time passes.

At the end of the first state ST1, the controller CNT1 switches control states from the first state ST1 to a second state ST2.

In the second state ST2, the controller CNT1 keeps the first switch SW1 off and the second switch SW2 on. In the second state ST2, the switching voltage VSW has a value approximately equal to the ground potential GND. In the second state ST2, the inductor current IL decreases as time passes.

When the inductor current IL has decreased to a predetermined value, the controller CNT1 ends the second state ST2, and switches control states from the second state ST2 to a third state ST3. A checker (not illustrated) that checks whether the inductor current IL has decreased down to the predetermined value may be provided separately from the controller CNT1, or may be incorporated in the controller CNT1. In this embodiment, the predetermined value mentioned above is zero.

In the third state ST3, the controller CNT1 keeps the first and second switches SW1 and SW2 off. In the third state ST3, the connection node between the first and second switches SW1 and SW2 is in a high-impedance state, and the switching voltage VSW has a value approximately equal to that of the output voltage VOUT. In the third state ST3, the inductor current IL is zero.

A periodic signal S1 is a signal in which pulses appear at a fixed cycle Tfix. The periodic signal S1 may be a signal generated within the controller CNT1, or may be a signal generated outside the controller CNT1 and is acquired by the controller CNT1.

When a pulse rises in the periodic signal S1, the controller CNT1 ends the third state ST3, and switches control states from the third state ST3 to a fourth state ST4.

In the fourth state ST4, the controller CNT1 keeps the first switch SW1 off and the second switch SW2 on. In the fourth state ST4, the switching voltage VSW has a value approximately equal to that of the ground potential GND. In the fourth state ST4, the inductor current IL flows from the application terminal for the output voltage VOUT to the connection node between the first and second switches SW1 and SW2, and increases as time passes. In the fourth state ST4, the inductor current IL is generated. The energy resulting from regeneration of the inductor current IL is released on transition from the fourth state ST4 to the first state ST1; thus, on transition from the fourth state ST4 to the first state ST1, the switching voltage VSW rises abruptly.

When the pulse falls in the periodic signal S1, the controller CNT1 ends the fourth state ST4, and switches control states from the fourth state ST4 to the first state ST1.

The controller CNT1 repeats the first, second, third, and fourth states ST1, ST2, ST3, and ST4 at the fixed cycle Tfix. It is preferable that dead time periods in which the first and second switches SW1 and SW2 are both off be provided one between the first and second states ST1 and ST2 and one between the fourth and first states ST4 and ST1. In a case where dead time periods are provided one between the first and second states ST1 and ST2 and one between the fourth and first states ST4 and ST1, the fixed cycle Tfix equals the total of the following periods added together: the first state ST1, the dead time period between the first and second states ST1 and ST2, the second state ST2, the third state ST3, the fourth state ST4, and the dead time period between the fourth and first states ST4 and ST1.

The switching power supply device 1A is configured to operate at the fixed cycle Tfix and not to produce loss in the third state ST3, and thus achieves high efficiency without varying the switching frequency. As the load LD1 is lighter, the first state ST1 is shorter and the third state ST3 is longer; thus the switching power supply device 1A helps greatly improve efficiency under a light load LD1.

In a modified example of this embodiment, the second switch SW2 may have the second terminal configured to be connectable to an application terminal for a low voltage lower than the input voltage VIN and different from the ground potential.

Second Embodiment

Figure 3:
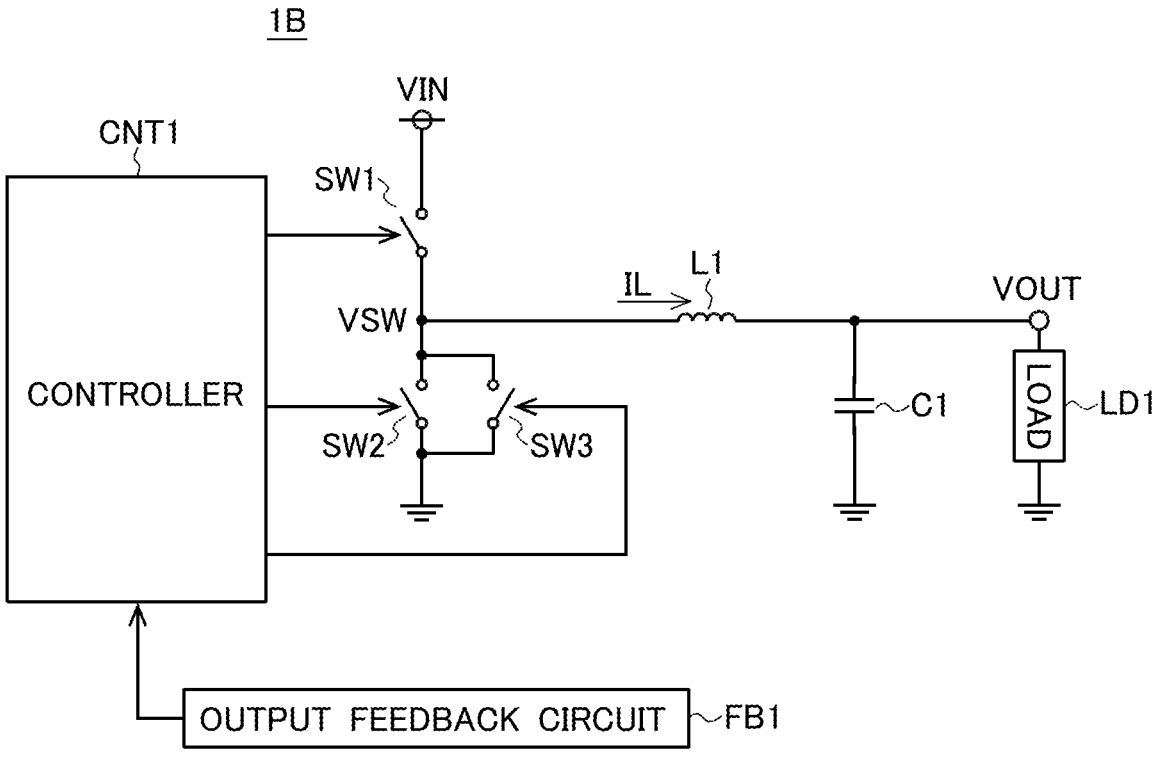
FIG. 3 is a diagram showing a configuration of a switching power supply device according to a second embodiment.

With respect to a second embodiment, no overlapping description will be repeated for such elements and features as are similar to those in the first embodiment. FIG. 3 is a diagram showing the configuration of a switching power supply device according to the second embodiment. The switching power supply device 1B according to the second embodiment (hereinafter "switching power supply device 1B") results from adding a switch SW3 to the switching power supply device 1A.

The switch SW3 is connected in parallel with the switch SW2. That is, the first terminal of the switch SW3 is connected to the first terminal of the switch SW2, and the second terminal of the switch SW3 is connected to the second terminal of the switch SW2. The third switch SW3 can be implemented with, for example, an N-channel MOS transistor. The controller CNT1 not only turns on and off the first and second switches SW1 and SW2 but also turns on and off the third switch SW3.

The switch SW3 has at least either of a lower on-state resistance (the resistance between the first and second terminals in the on state) and a lower capacitance (the parasitic capacitance between the first and second terminals) than the switch SW2.

Figure 4:
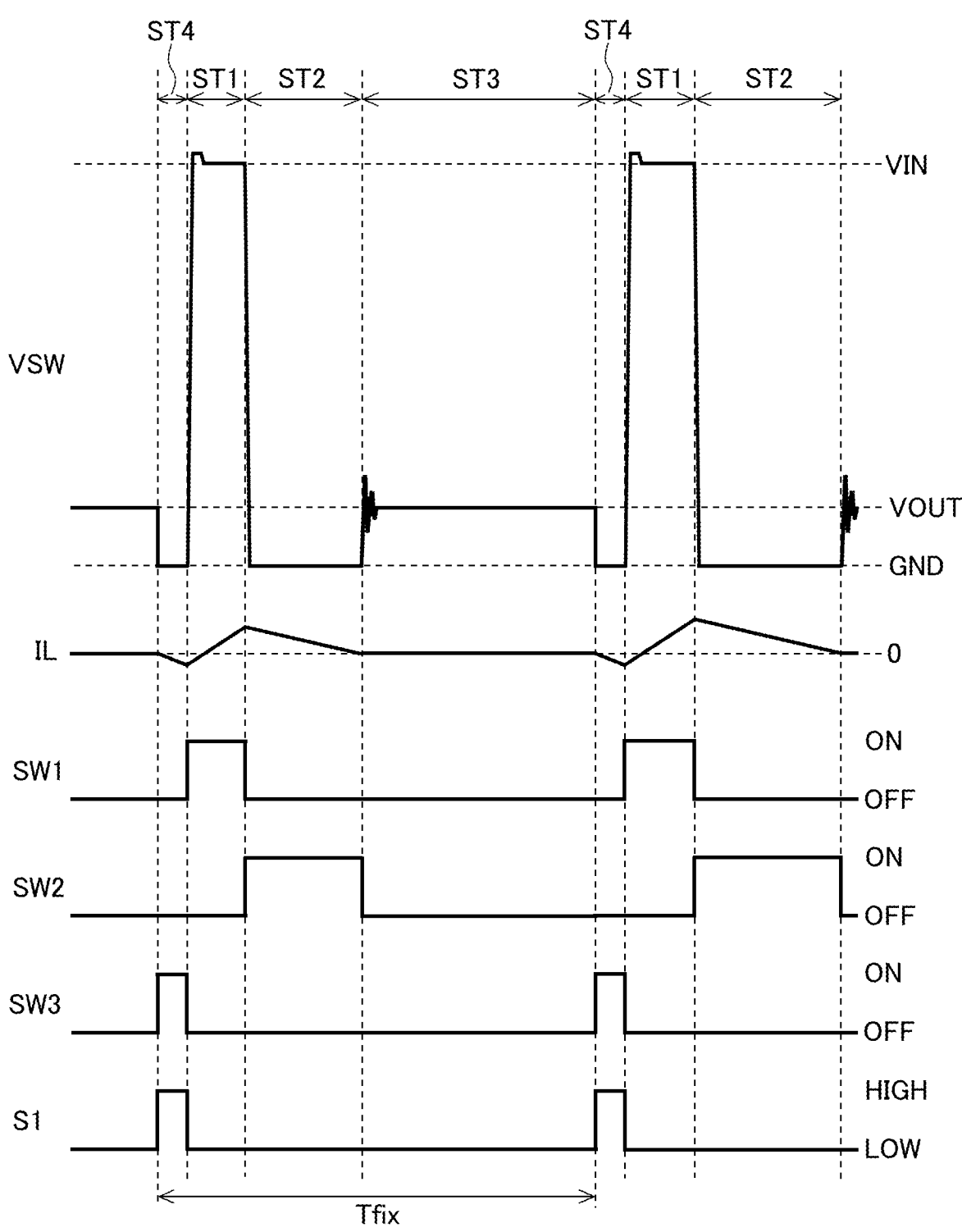
FIG. 4 is a timing chart showing the operation of the switching power supply device according to the second embodiment.

FIG. 4 is a timing chart showing the operation of the switching power supply device 1B. The operation of the switching power supply device 1B differs from that of the switching power supply device 1A in that, in the fourth state ST4, the controller CNT1 keeps the second switch SW2 off.

In the fourth state ST4, the controller CNT1 keeps, instead of the second switch SW2, the third switch SW3 on. As mentioned above, the switch SW3 has at least either of a lower on-state resistance and a lower capacitance than the switch SW2. Thus, the switching power supply device 1B produces less loss in the fourth state ST4 than the switching power supply device 1A.

In the first, second, and third states ST1, ST2, and ST3, the controller CNT1 keeps the third switch SW3 off.

The switching power supply device 1B is configured to operate at the fixed cycle Tfix and not to produce loss in the third state ST3, and thus achieves high efficiency without varying the switching frequency. As the load LD1 is lighter, the first state ST1 is shorter and the third state ST3 is longer; thus the switching power supply device 1B helps greatly improve efficiency under a light load LD1.

In a modified example of this embodiment, in the fourth state ST4, the controller CNT1 may keep the second and third switches SW2 and SW3 both on.

In another modified example of this embodiment, the second and third switches SW2 and SW3 may have their respective second terminals configured to be connectable to an application terminal for a low voltage lower than the input voltage VIN and different from the ground potential.

Third Embodiment

Figure 5:
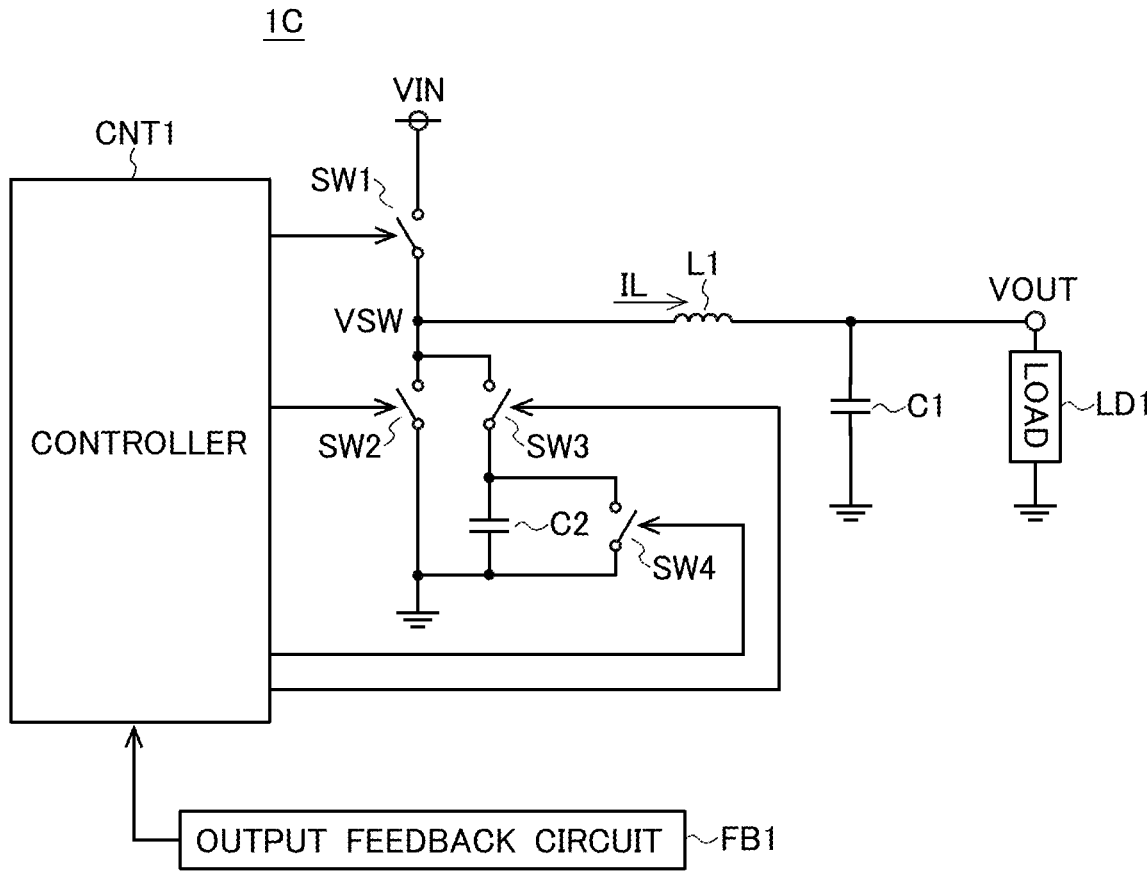
FIG. 5 is a diagram showing a configuration of a switching power supply device according to a third embodiment.

With respect to a third embodiment, no overlapping description will be repeated for such elements and features as are similar to those in the second embodiment. FIG. 5 is a diagram showing the configuration of a switching power supply device according to the third embodiment. The switching power supply device 1C according to the third embodiment (hereinafter "switching power supply device 1C") results from adding a switch SW3, a capacitance C2, and a switch SW4 to the switching power supply device 1A.

The first terminal of the switch SW3 is connected to the connection node between the first and second switches SW1 and SW2. The second terminal of the switch SW3 is connected to the first terminal of the capacitance C2 and to the first terminal of the fourth switch SW4. The second terminal of the capacitance C2 and the second terminal of the fourth switch SW4 are connected to the ground potential. The third switch SW3 can be implemented with, for example, an N-channel MOS transistor. The fourth switch SW4 can be implemented with, for example, an N-channel MOS transistor. The controller CNT1 not only turns on and off the first and second switches SW1 and SW2 but also turns on and off the third and fourth switches SW3 and SW4.

The switch SW3 has at least either of a lower on-state resistance (the resistance between the first and second terminals in the on state) and a lower capacitance (the parasitic capacitance between the first and second terminals) than the switch SW2. As opposed to the embodiment under discussion, the switch SW3 may have an on-state resistance and a capacitance largely equal to those of the switch SW2.

The switch SW4 is a switch for discharging the capacitance C2. With the switch SW4 on, the capacitance C2 is short-circuited across its terminals to be discharged.

Figure 6:
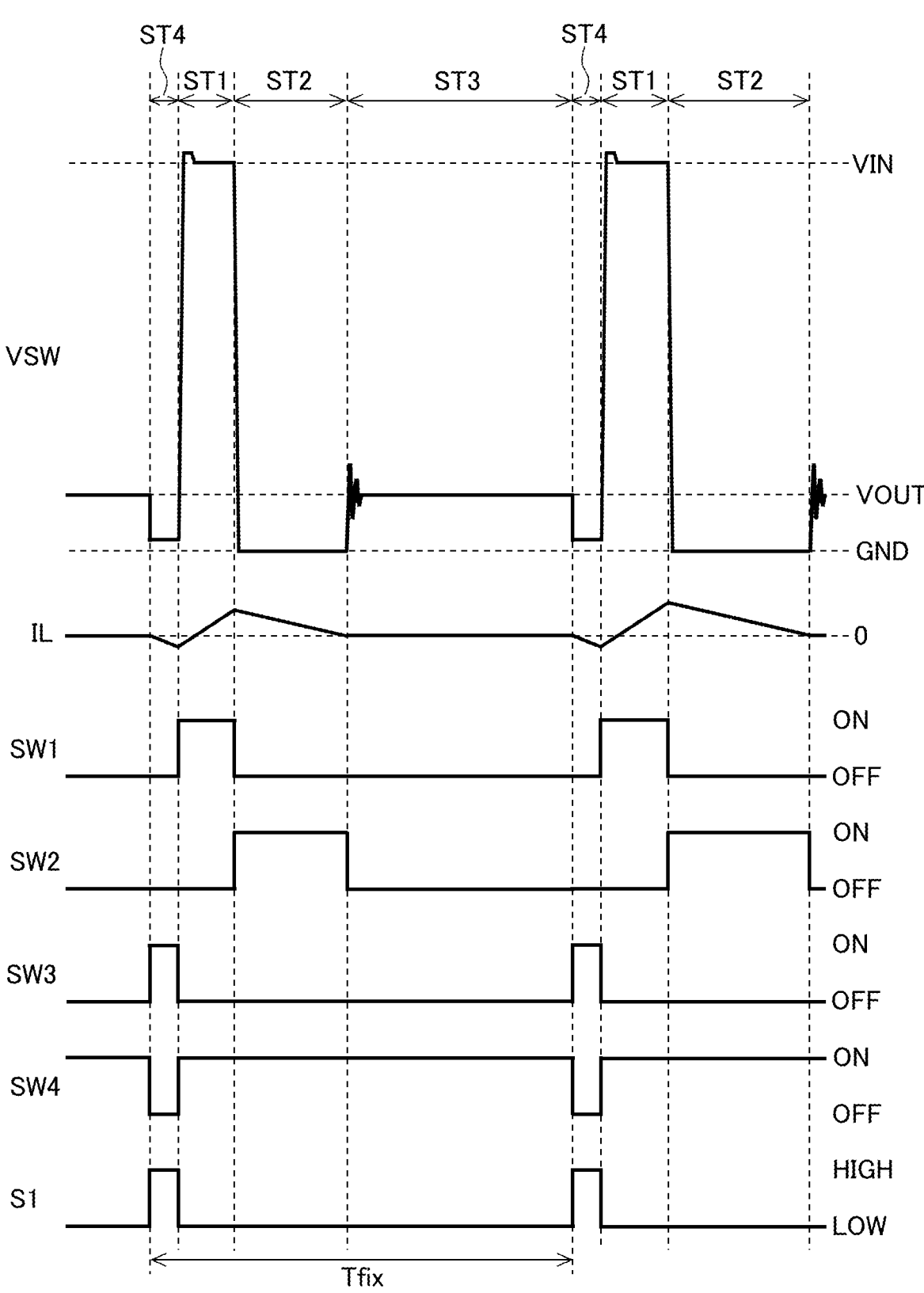
FIG. 6 is a timing chart showing the operation of the switching power supply device according to the third embodiment.

FIG. 6 is a timing chart showing the operation of the switching power supply device 1C. The switching power supply device 1C operates basically in the same way as the switching power supply device 1B. In the switching power supply device 1C, the controller CNT1 additionally turns on and off the fourth switch SW4. The controller CNT1 turns on and off the third and fourth switches SW3 and SW4 complementarily. Specifically, the controller CNT1 keeps the fourth switch SW4 on in the first, second, and third states ST1, ST2, and ST3 and keeps the fourth switch SW4 off in the fourth state ST4.

In the switching power supply device 1C, in the fourth state ST4, the switching voltage VSW is a voltage resulting from capacitance-dividing the input voltage VIN with the parasitic capacitance between the first and second terminals of the first switch SW1 and the sum of the parasitic capacitance between the first and second terminals of the third switch SW3 and the capacitance C2. Thus, through adjustment of the capacitance value of the capacitance C2, the value of the switching voltage VSW in the fourth state ST4 can be adjusted. That is, through adjustment of the capacitance value of the capacitance C2, it is possible to adjust how the switching voltage VSW rises on transition from the fourth state ST4 to the first state ST1.

For example, the controller CNT1 can be incorporated in a semiconductor integrated circuit device while the capacitance C2 is left as a component to be externally connected to it; this makes it easy to adjust the value of the switching voltage VSW in the fourth state ST4.

The switching power supply device 1C is configured to operate at the fixed cycle Tfix and not to produce loss in the third state ST3, and thus achieves high efficiency without varying the switching frequency. As the load LD1 is lighter, the first state ST1 is shorter and the third state ST3 is longer; thus the switching power supply device 1C helps greatly improve efficiency under a light load LD1.

In a modified example of this embodiment, the second switch SW2, the capacitance C2, and the fourth switch SW4 may have their respective second terminals configured to be connectable to an application terminal for a low voltage lower than the input voltage VIN and different from the ground potential.

Fourth Embodiment

Figure 7:
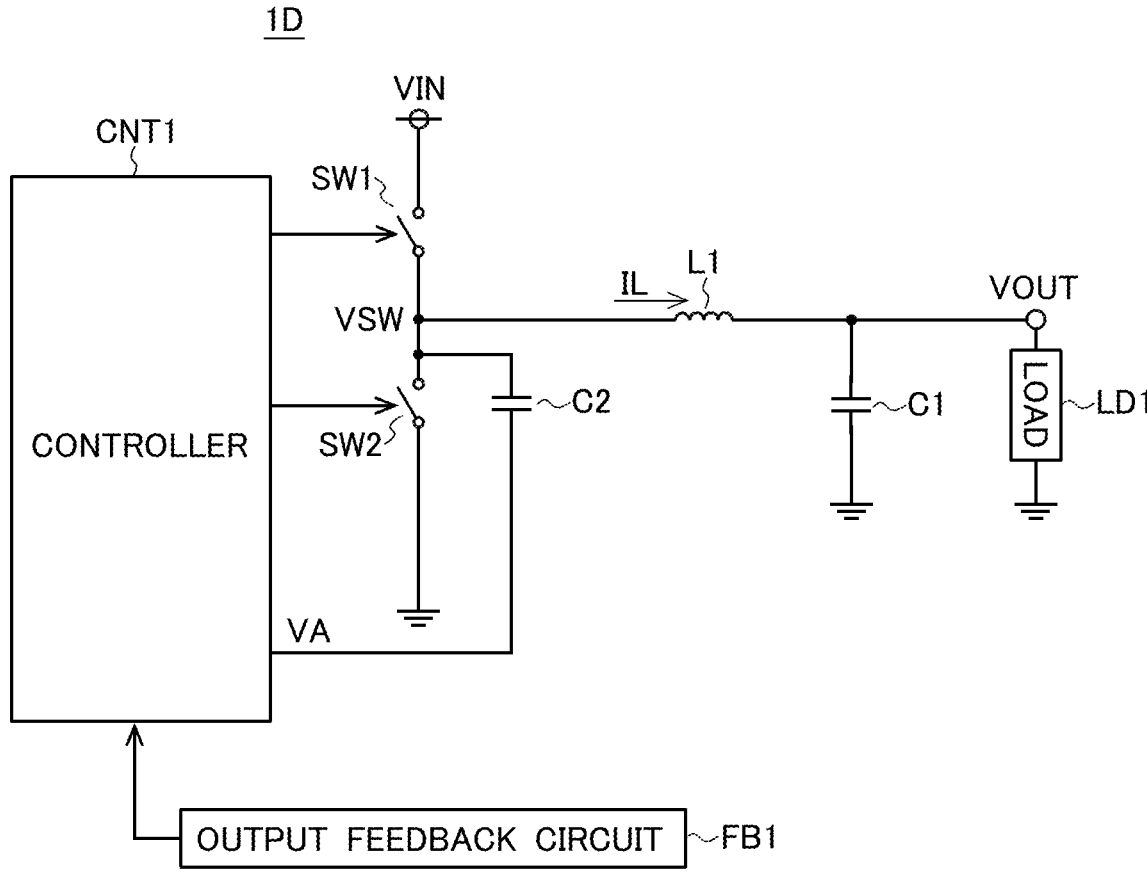
FIG. 7 is a diagram showing a configuration of a switching power supply device according to a fourth embodiment.
Figure 8:
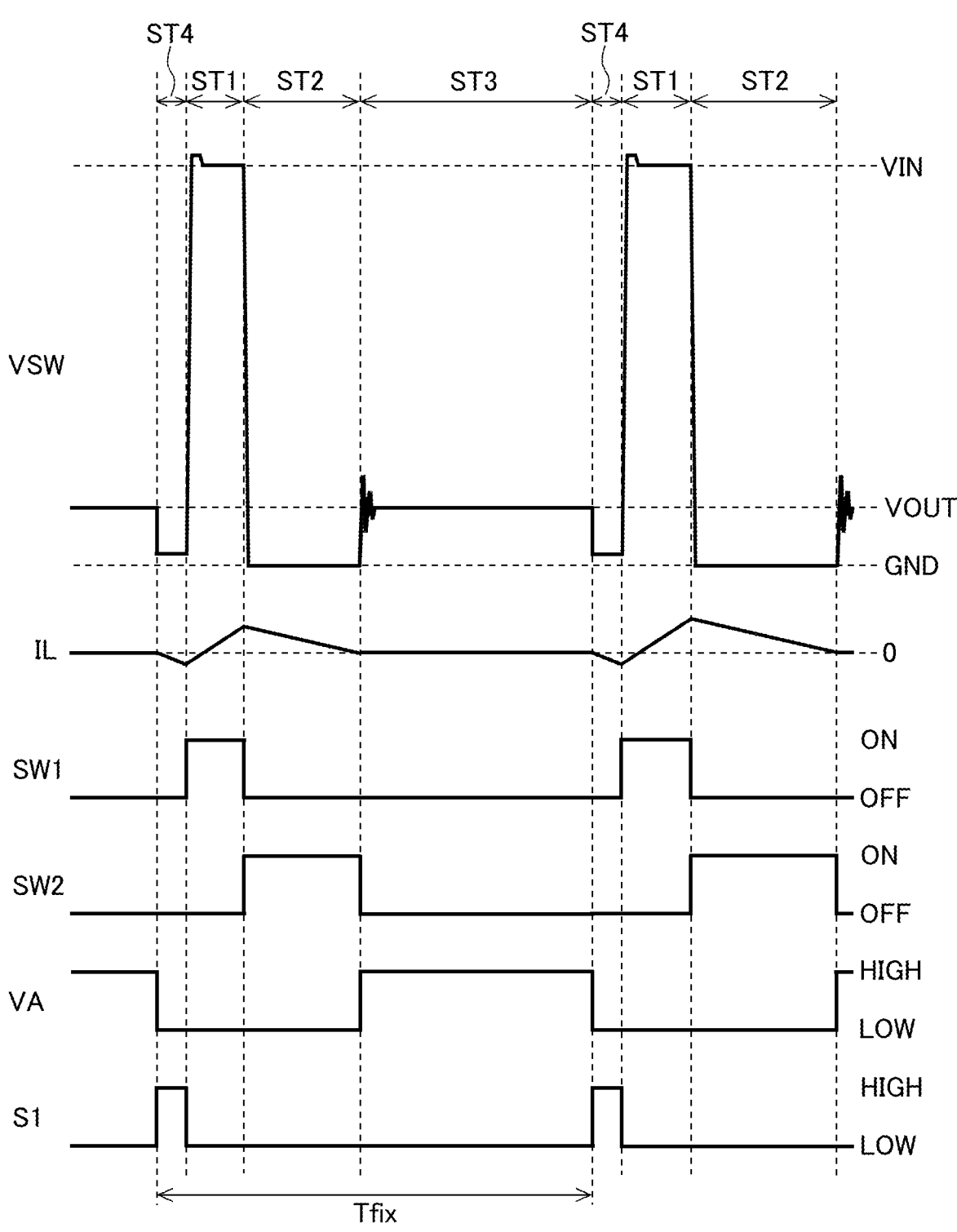
FIG. 8 is a timing chart showing the operation of the switching power supply device according to the fourth embodiment.

With respect to a fourth embodiment, no overlapping description will be repeated for such elements and features as are similar to those in the third embodiment. FIG. 7 is a diagram showing the configuration of a switching power supply device according to the fourth embodiment. The switching power supply device 1D according to the fourth embodiment (hereinafter "switching power supply device 1D") results from adding a capacitance C2 to the switching power supply device 1A.

The first terminal of the capacitance C2 is connected to the connection node between the first and second switches SW1 and SW2. The controller CNT1 controls a voltage VA that is applied to the second terminal of the switch SW3. For example, the controller CNT1 keeps the voltage VA at high level (e.g., at the same value as the output voltage VOUT) in the third state ST3 and at low level (e.g., at the ground potential GND) in the first, second, and fourth states ST1, ST2, and ST4.

Through adjustment of the value of the voltage VA in the fourth state ST4, it is possible to adjust how the switching voltage VSW rises on transition from the fourth state ST4 to the first state ST1.

The switching power supply device 1D is configured to operate at the fixed cycle Tfix and not to produce loss in the third state ST3, and thus achieves high efficiency without varying the switching frequency. As the load LD1 is lighter, the first state ST1 is shorter and the third state ST3 is longer; thus the switching power supply device 1D helps greatly improve efficiency under a light load LD1.

In a modified example of this embodiment, the second switch SW2 may have the second terminal configured to be connectable to an application terminal for a low voltage lower than the input voltage VIN and different from the ground potential.

Fifth Embodiment

In each controller CNT1 of the above-described switching power supply devices according to the first to fourth embodiments, as the load LD1 is lighter, the first state ST1 is shorter in duration. That is, in the switching power supply devices according to the first to fourth embodiments, as the load LD1 is lighter, the pulse width of a control signal for controlling the switch SW1 is thinner, causing a difficulty in generating the control signal.

The switching power supply device according to a fifth embodiment is enabled to solve the foregoing problem of the switching power supply devices according to the first to fourth embodiments.

The switching power supply device according to the fifth embodiment is an improvement of the switching power supply device according to the first embodiment. Therefore, with respect to the fifth embodiment, no overlapping description will be repeated for such elements and features as are similar to those in the first embodiment.

The controller CNT1 according to the fifth embodiment repeats the first, second, third, and fourth states ST1, ST2, ST3, and ST4 at a fixed cycle under the condition that the load LD1 falls within a first range (normal load state). Accordingly, the switching power supply device according to the fifth embodiment is allowed to fix the switching frequency under the condition that the load LD1 keeps within the first range.

While the load LD1 is within a second range (light-load state) lighter than the first range, by setting the cycle longer correspondingly as the load LD1 is lighter, the controller CNT1 according to the fifth embodiment repeats the first, second, third, and fourth states ST1, ST2, ST3, and ST4. Therefore, the switching power supply device according to the fifth embodiment suppresses thinning of the pulse width of a control signal for controlling the switch SW1 under the condition that the load LD1 keeps within the second range. Thus, the switching power supply device according to the fifth embodiment allows normal switching control to be fulfilled easily even under the condition that the load LD1 keeps in a light-load state.

The controller CNT1 according to the fifth embodiment has a dead time period DT, in which the first and second switches SW1 and SW2 are kept off, provided between the fourth state ST4 and the first state ST1. Then, the controller CNT1 according to the fifth embodiment sets the length of the dead time period DT and the length of the fourth state ST4 to fixed values, respectively, so that the first state ST1 is started at a zero-crossing point of the inductor current IL under the condition that no component variations are involved. As a result of this, the switching power supply device according to the fifth embodiment is enabled to reduce loss involved in turn-on of the first switch SW1, contributing to achievement of even higher efficiency.

<<First Configuration Example of Controller According to Fifth Embodiment>>

Figure 9:
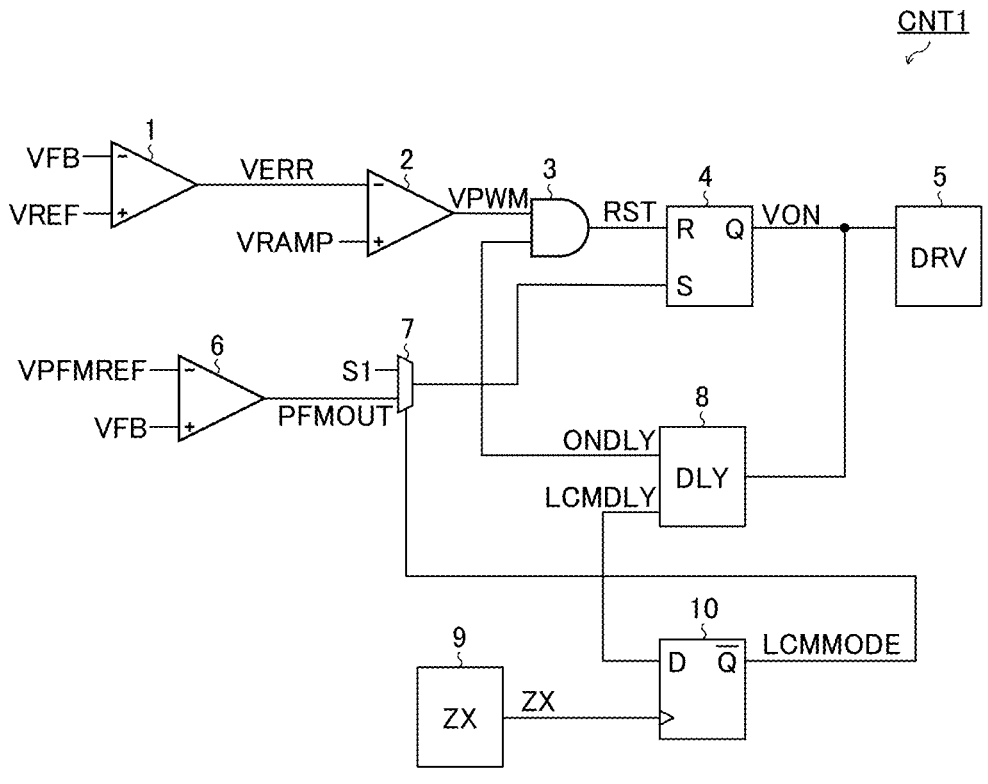
FIG. 9 is a diagram showing a first configuration example of a controller according to a fifth embodiment.
Figure 10:
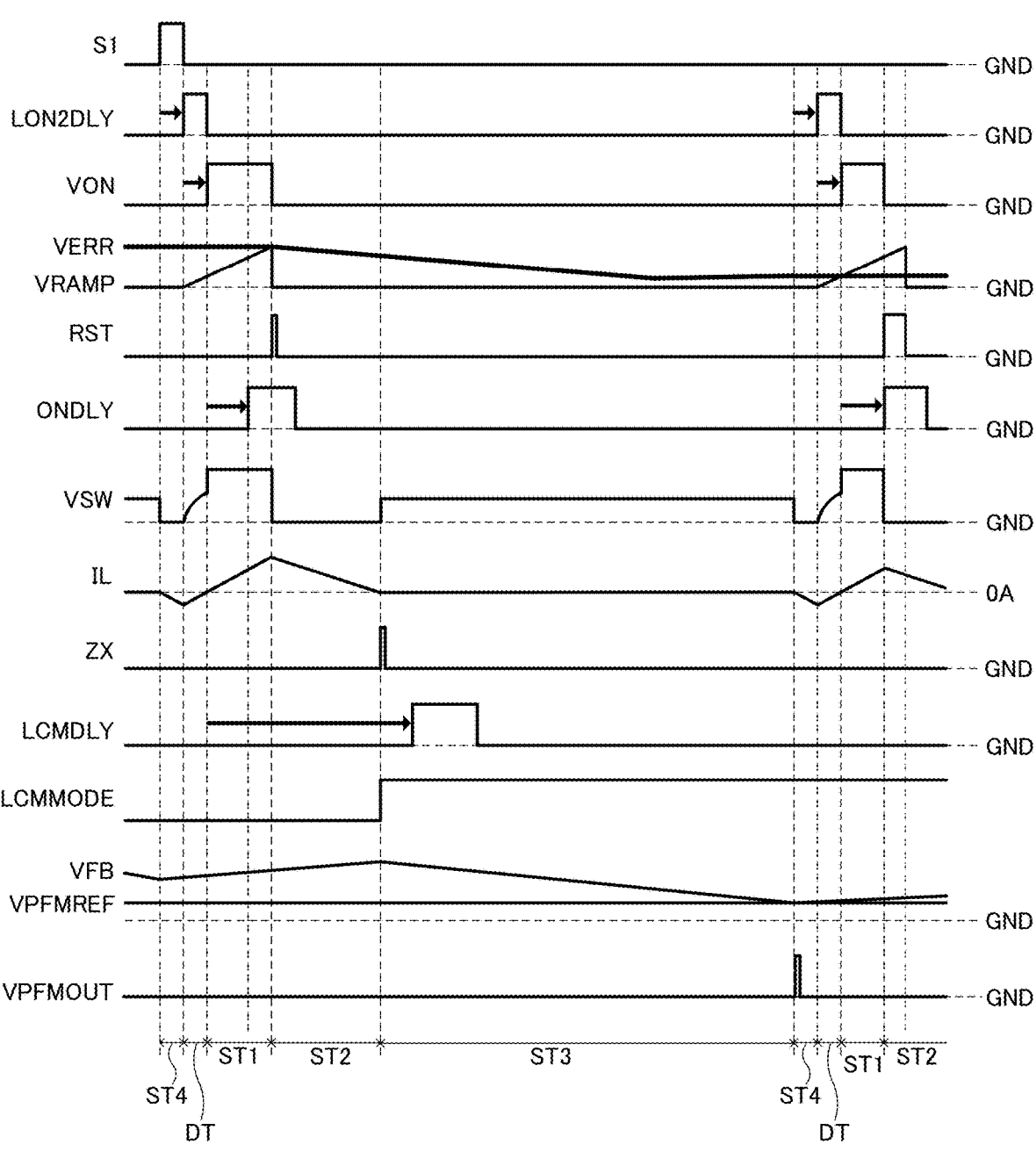
FIG. 10 is a timing chart showing the operation of the controller shown in FIG. 9.

FIG. 9 is a diagram showing a first configuration example of the controller CNT1 according to the fifth embodiment. FIG. 10 is a timing chart showing the operation of the controller shown in FIG. 9.

The controller CNT1 shown in FIG. 9 includes an error amplifier 1, a PWM (Pulse Width Modulation) comparator 2, an AND gate 3, a latch circuit 4, a driver 5, a PFM (Pulse Frequency Modulation) comparator 6, a selector 7, a delay circuit 8, a zero-crossing point detection circuit 9, and a latch circuit 10. In the configuration shown in FIG. 9, an RS flip-flop is used as an example of the latch circuit 4, and a D flip-flop is used as an example of the latch circuit 10. Therefore, in the following description, the latch circuit 4 will be referred to as RS flip-flop 4, and the latch circuit 10 referred to as D flip-flop 10.

The error amplifier 1 outputs an error signal VERR commensurate with a difference between a feedback signal VFB outputted from the output feedback circuit FB1 and a reference voltage VREF.

The PWM comparator 2 outputs a PWM signal VPWM which is a comparison result between the error signal VERR and a ramp voltage VRAMP.

The AND gate 3 outputs a reset signal RST which is an AND of the PWM signal VPWM and a delay signal ONDLY. The delay signal ONDLY will be described later.

The RS flip-flop 4 generates a delay signal LON2DLY by delaying a signal, which has been supplied to the set terminal (S terminal), inside the RS flip-flop 4. The RS flip-flop 4 generates and outputs an on-time setting voltage VON which is set by the delay signal LON2DLY and reset by the reset signal RST.

The driver 5 controls the first and second switches SW1 and SW2 based on the on-time setting voltage VON.

The PFM comparator 6 outputs a signal VPFMOUT commensurate with a difference between the feedback signal VFB, which is outputted from the output feedback circuit FB1, and a reference voltage VPFMREF. In the signal VPFMOUT, pulses are generated when the output voltage VOUT has come to less than a certain value.

The selector 7 selects and supplies either one of the periodic signal S1 and the signal VPFMOUT to the set terminal (S terminal) of the RS flip-flop 4. The selector 7 selects the periodic signal S1 when a light-load mode signal LCMMODE is low. The selector 7 selects the signal VPFMOUT when the light-load mode signal LCMMODE is high. The light-load mode signal LCMMODE will be described later.

The delay circuit 8 generates a delay signal ONDLY resulting from delaying the on-time setting voltage VON by a first specified time. The delay circuit 8 generates a delay signal LCMDLY resulting from delaying the on-time setting voltage VON by a second specified time. The second specified time is longer than the first specified time.

The zero-crossing point detection circuit 9 detects a zero-crossing point of the inductor current IL, and outputs a zero-crossing point detection signal ZX. The zero-crossing point detection signal ZX outputted from the zero-crossing point detection circuit 9 goes high when the inductor current IL has decreased from positive level and come to the zero-crossing point.

The D flip-flop 10 holds the delay signal LCMDLY in synchronization with the zero-crossing point detection signal ZX, and outputs an inverted signal of the held delay signal LCMDLY. The inverted signal of the delay signal LCMDLY held by the D flip-flop 10 is the above-mentioned light-load mode signal LCMMODE.

When a duration from a start time of the first state ST1 until a detection of the zero-crossing point of the inductor current IL is less than a certain value (second specified time), the controller CNT1 shown in FIG. 9 decides that the load LD1 is in the light-load state.

With use of the delay signal ONDLY, the controller CNT1 shown in FIG. 9 sets a minimum time (first specified time) of the first state ST1 under the condition that the load LD1 is in the light-load state. Thus, the length of the first state ST1 never becomes excessively short, making it even easier to fulfill normal switching control.

<<Second Configuration Example of Controller According to Fifth Embodiment>>

Figure 11:
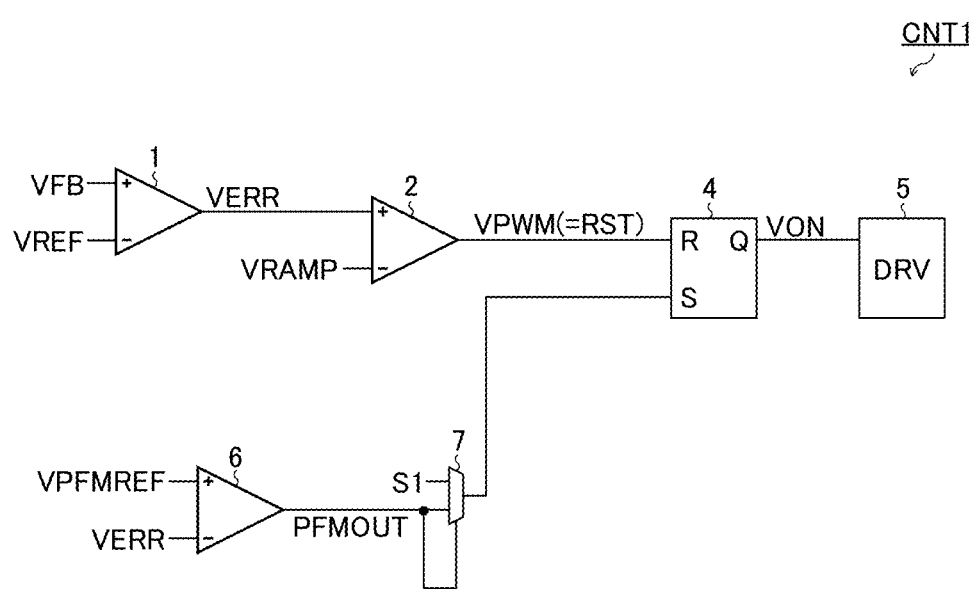
FIG. 11 is a diagram showing a second configuration example of the controller according to the fifth embodiment.
Figure 12:
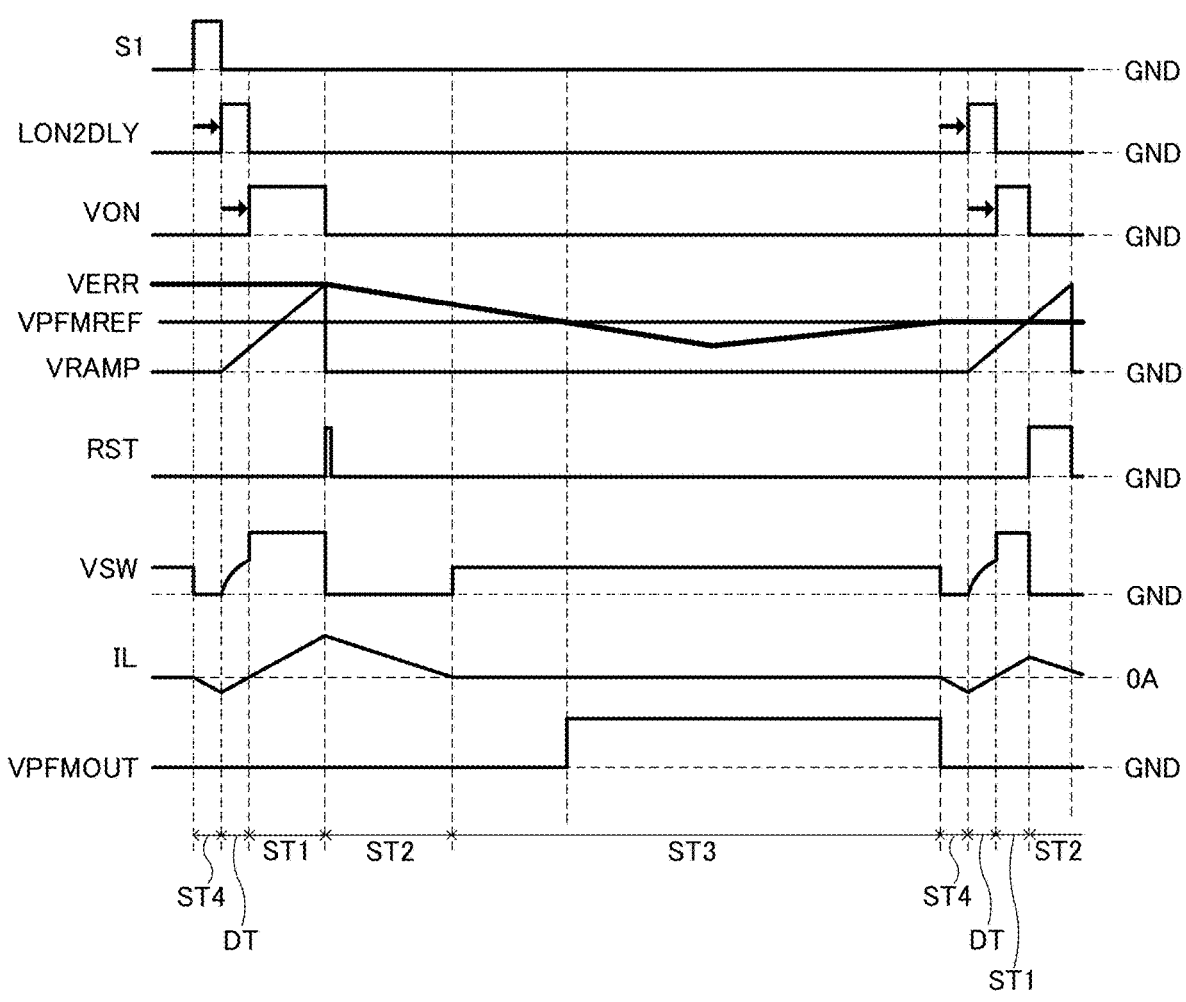
FIG. 12 is a timing chart showing the operation of the controller shown in FIG. 11.

FIG. 11 is a diagram showing a second configuration example of the controller according to the fifth embodiment. FIG. 12 is a timing chart showing the operation of the controller shown in FIG. 11. In this configuration example, parts of description similar to those of the first configuration example will be omitted as appropriate.

The controller CNT1 shown in FIG. 11 includes the error amplifier 1, the PWM comparator 2, the RS flip-flop 4, the driver 5, the PFM comparator 6, and the selector 7.

In this configuration example, the PWM signal VPWM is replaced by the reset signal RST.

The selector 7 selects the periodic signal S1 when the signal VPFMOUT is low. The selector 7 selects the signal VPFMOUT when the signal VPFMOUT is high.

When the error signal VERR is beyond the reference voltage VPFMREF, the controller CNT1 shown in FIG. 11 decides that the load LD1 is in the light-load state.

<<Third Configuration Example of Controller According to Fifth Embodiment>>

Figure 13:
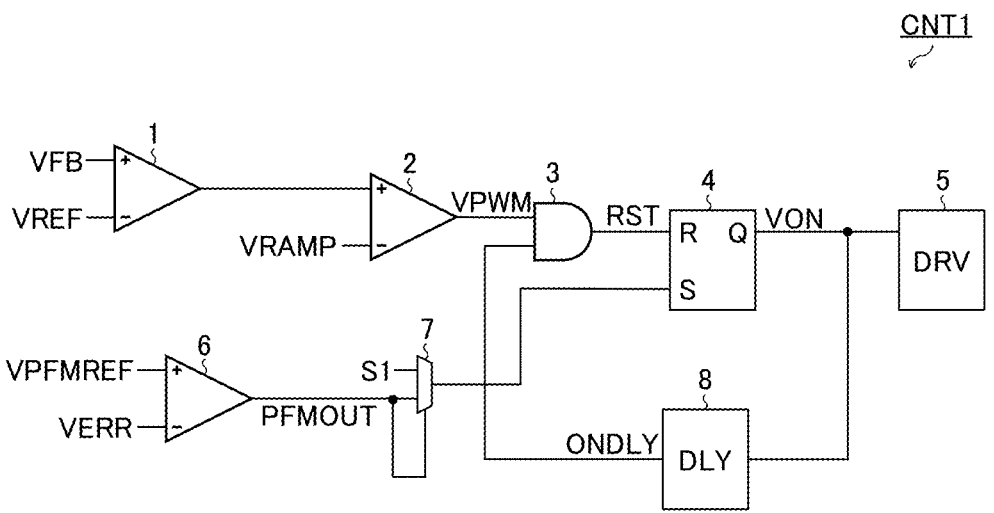
FIG. 13 is a diagram showing a third configuration example of the controller according to the fifth embodiment.
Figure 14:
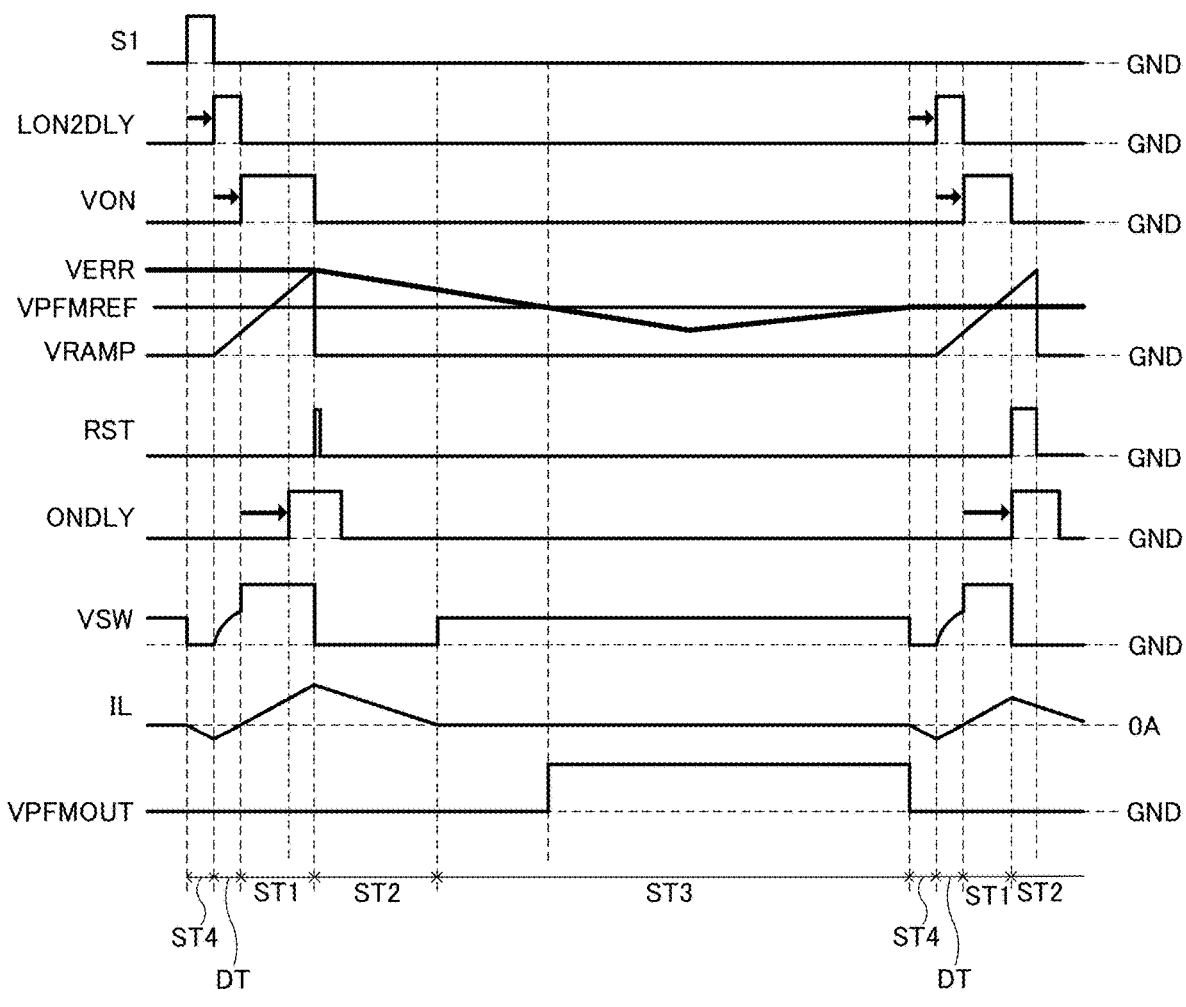
FIG. 14 is a timing chart showing the operation of the controller shown in FIG. 13.

FIG. 13 is a diagram showing a third configuration example of the controller according to the fifth embodiment. FIG. 14 is a timing chart showing the operation of the controller shown in FIG. 13. In this configuration example, parts of description similar to those of the second configuration example will be omitted as appropriate.

The controller CNT1 shown in FIG. 13 is so configured that an AND gate 3 and a delay circuit 8 are added to the controller CNT1 shown in FIG. 11.

The AND gate 3 and the delay circuit 8 are similar to those of the first configuration example except that the delay circuit 8 of the third configuration example generates only the delay signal ONDLY.

When the error signal VERR is beyond the reference voltage VPFMREF, the controller CNT1 shown in FIG. 13 decides that the load LD1 is in the light-load state.

With use of the delay signal ONDLY, the controller CNT1 shown in FIG. 13 sets a minimum time duration (first specified time) of the first state ST1 while the load LD1 is in the light-load state. Thus, the length of the first state ST1 never becomes excessively short, making it even easier to fulfill normal switching control.

Modified Examples of Fifth Embodiment

The switching power supply device according to the fifth embodiment is an improvement of the switching power supply device according to the first embodiment as described above. However, similar improvements may be made also on the switching power supply devices according to the second to fourth embodiments. Furthermore, modifications similar to those of the modified examples described in the first to fourth embodiments may also be made on the switching power supply device according to the fifth embodiment.

Sixth Embodiment

Each controller CNT1 of the switching power supply devices according to the first to fifth embodiments is so configured that as the load LD1 is heavier, the first state ST1 is longer in duration correspondingly. That is, with the switching power supply devices according to the first to fifth embodiments, as the load LD1 is heavier, the pulse width of the control signal for controlling the first switch SW1 is thicker, making it difficult to fulfill control within the fixed cycle Tfix.

A switching power supply device according to a sixth embodiment is enabled to solve the foregoing problem of the switching power supply devices according to the first to fifth embodiments.

The switching power supply device according to the sixth embodiment is an improvement of the switching power supply device according to the first embodiment. Therefore, with respect to the sixth embodiment, no overlapping description will be repeated for such elements and features as are similar to those in the first embodiment.

The controller CNT1 according to the sixth embodiment repeats the first, second, third, and fourth states ST1, ST2, ST3, and ST4 at a fixed cycle based on the periodic signal S1. Accordingly, the switching power supply device according to the sixth embodiment is allowed to fix the switching frequency in synchronization with the periodic signal S1.

The controller CNT1 according to the sixth embodiment keeps the periodic signal S1 masked until a zero-crossing point of the inductor current IL is detected. Therefore, while the load LD1 is in a heavy-load state, which involves a load heavier than in the normal load state, the controller CNT1 according to the sixth embodiment operates asynchronously with the periodic signal S1. Thus, for the switching power supply device according to the sixth embodiment, normal switching control is achievable more easily even when the load LD1 is in a heavy-load state.

The controller CNT1 according to the sixth embodiment has a dead time period DT, in which the first and second switches SW1 and SW2 are kept off, provided between the fourth state ST4 and the first state ST1. Then, the controller CNT1 according to the sixth embodiment sets the length of the dead time period DT and the length of the fourth state ST4 to fixed values, respectively, so that the first state ST1 is started at a zero-crossing point of the inductor current IL under the condition that no component variations are involved. As a result of this, the switching power supply device according to the sixth embodiment is enabled to reduce loss involved in turn-on of the first switch SW1, contributing to achievement of even higher efficiency.

<<First Configuration Example of Controller According to Sixth Embodiment>>

Figure 15:
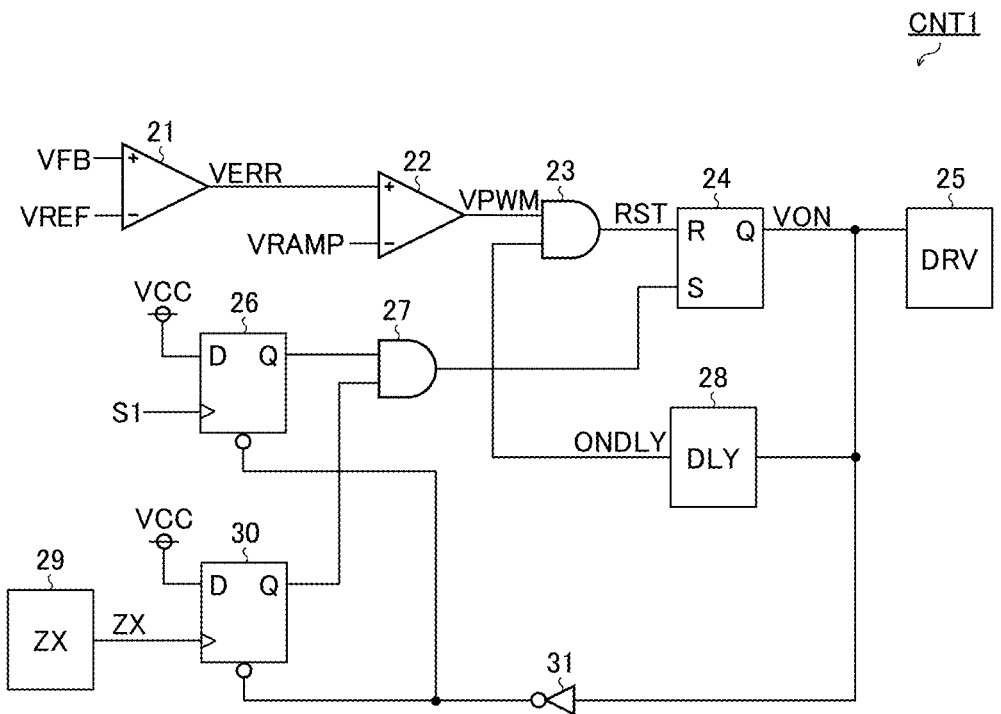
FIG. 15 is a diagram showing a first configuration example of a controller according to a sixth embodiment.
Figure 16:
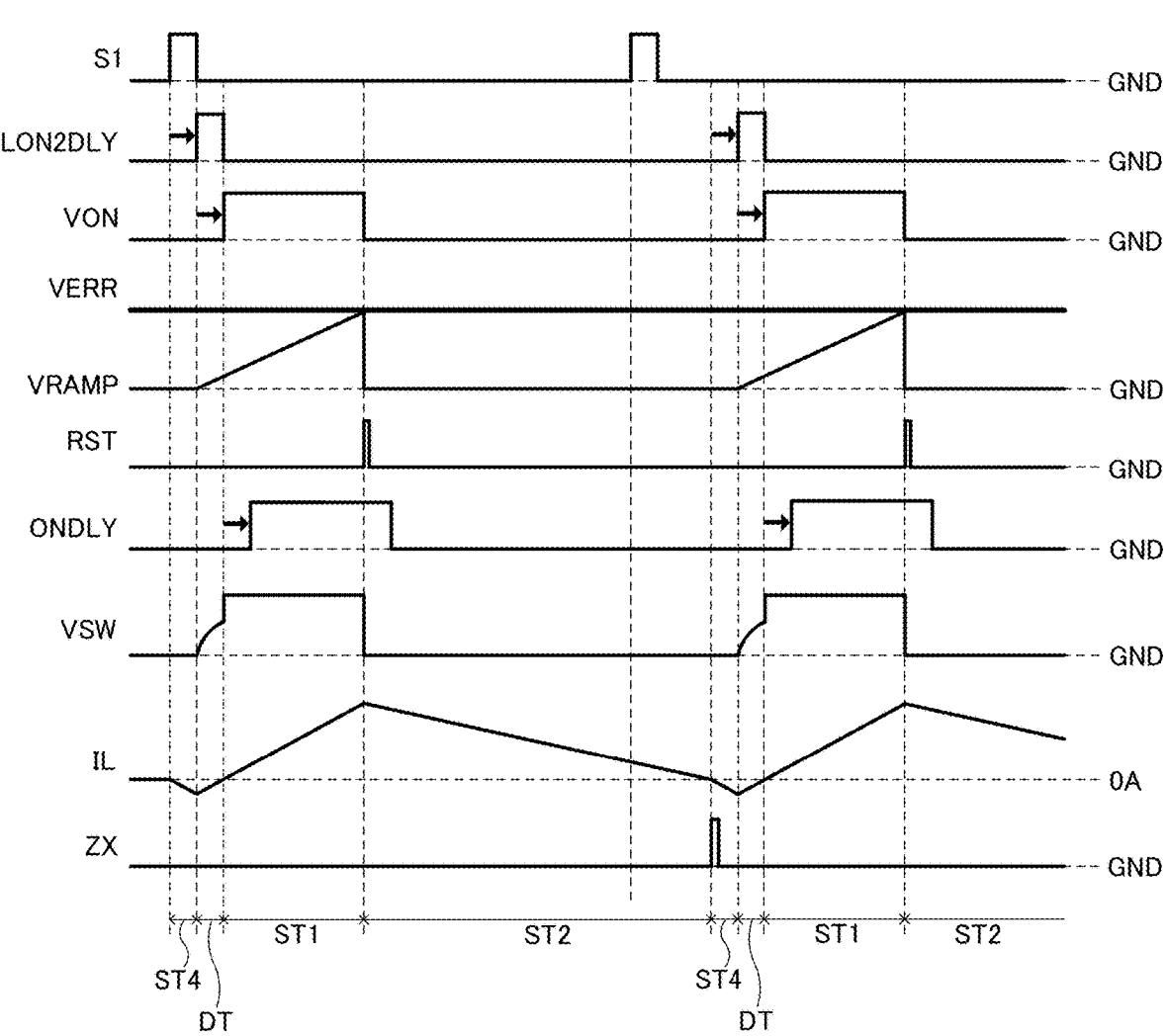
FIG. 16 is a timing chart showing the operation of the controller shown in FIG. 15.

FIG. 15 is a diagram showing a first configuration example of the controller CNT1 according to the sixth embodiment. FIG. 16 is a timing chart showing the operation of the controller CNT1 shown in FIG. 15.

The controller CNT1 shown in FIG. 15 includes an error amplifier 21, a PWM comparator 22, an AND gate 23, a latch circuit 24, a driver 25, a latch circuit 26, an AND gate 27, a delay circuit 28, a zero-crossing point detection circuit 29, a latch circuit 30, and a NOT gate 31. In the configuration shown in FIG. 15, an RS flip-flop is used as an example of the latch circuit 24, and a D flip-flop is used as an example of each of the latch circuits 26 and 30. Therefore, in the following description, the latch circuit 24 will be referred to as RS flip-flop 24, the latch circuit 26 referred to as D flip-flop 26, and the latch circuit 30 referred to as D flip-flop 30.

The error amplifier 21 outputs an error signal VERR commensurate with a difference between a feedback signal VFB outputted from the output feedback circuit FB1 and a reference voltage VREF.

The PWM comparator 22 outputs a PWM signal VPWM which is a comparison result between the error signal VERR and a ramp voltage VRAMP.

The AND gate 23 outputs a reset signal RST which is an AND of the PWM signal VPWM and a delay signal ONDLY. The delay signal ONDLY will be described later.

The RS flip-flop 24 generates a delay signal LON2DLY by delaying a signal, which is supplied to the set terminal (S terminal), inside the RS flip-flop 24. The RS flip-flop 24 generates and outputs an on-time setting voltage VON which is set by the delay signal LON2DLY and reset by the reset signal RST.

The driver 25 controls the first and second switches SW1 and SW2 based on the on-time setting voltage VON.

The D flip-flop 26 holds a voltage VCC, which is supplied to a D terminal, in synchronization with the periodic signal S1. The voltage VCC supplied to the D terminal of the D flip-flop 26 is set to a value which is to be processed as a high-level signal in the AND gate 27. The D flip-flop 26 is cleared by a logical inverted signal of the on-time setting voltage VON which is outputted from the NOT gate 31.

The AND gate 27 supplies an AND of an output of the D flip-flop 26 and an output of the D flip-flop 30 to the set terminal (S terminal) of the RS flip-flop 24.

The delay circuit 28 generates a delay signal ONDLY resulting from delaying the on-time setting voltage VON by a specified time.

The zero-crossing point detection circuit 29 detects a zero-crossing point of the inductor current IL, and outputs a zero-crossing point detection signal ZX. The zero-crossing point detection signal ZX outputted from the zero-crossing point detection circuit 29 goes high when the inductor current IL has decreased from positive level and come to the zero-crossing point.

The D flip-flop 30 holds the voltage VCC, which is supplied to the D terminal, in synchronization with the zero-crossing point detection signal ZX. The voltage VCC supplied to the D terminal of the D flip-flop 26 is set to a value which is processed as a high-level signal in the AND gate 27. The D flip-flop 30 is cleared by a logical inverted signal of the on-time setting voltage VON outputted from the NOT gate 31.

The NOT gate 31 supplies a logical inverted signal of the on-time setting voltage VON to each clear terminal of the D flip-flops 26 and 30.

When a zero-crossing point of the inductor current IL is detected after generation of a pulse in the periodic signal S1, the controller CNT1 shown in FIG. 15 starts the fourth state ST4 at a time point when the zero-crossing point of the inductor current IL is detected. Thus, when a zero-crossing point of the inductor current IL is detected after generation of a pulse in the periodic signal S1, i.e. under a heavy-load condition, the controller CNT1 can change the switching frequency in response to a magnitude of the load. That is, the controller CNT1 can obtain more successful load responsivity under a heavy-load condition.

<<Second Configuration Example of Controller According to Sixth Embodiment>>

Figure 17:
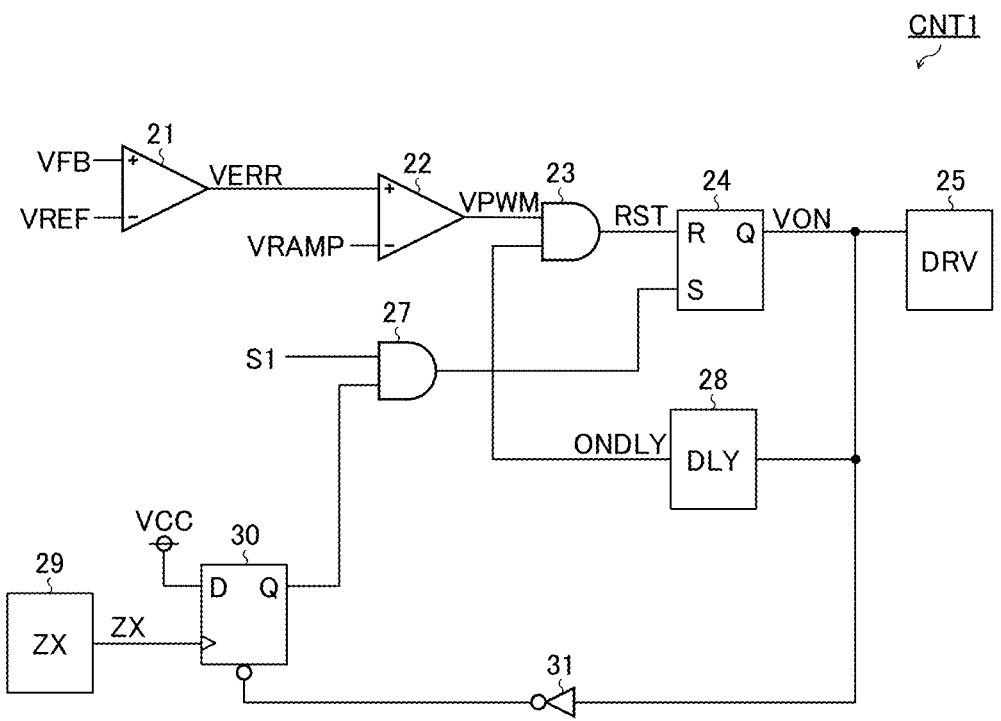
FIG. 17 is a diagram showing a second configuration example of the controller according to the sixth embodiment.
Figure 18:
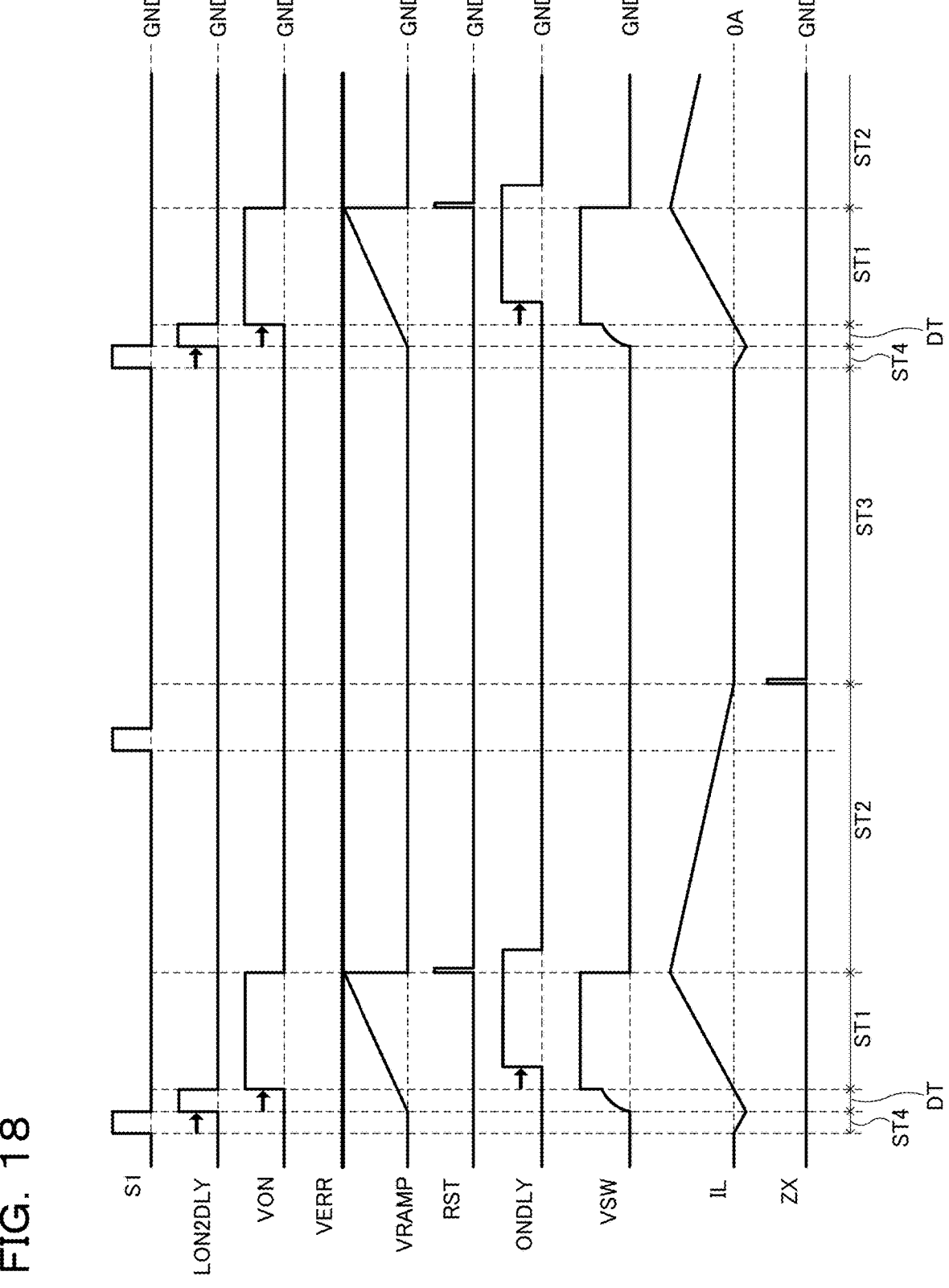
FIG. 18 is a timing chart showing the operation of the controller shown in FIG. 17.

FIG. 17 is a diagram showing a second configuration example of the controller according to the sixth embodiment. FIG. 18 is a timing chart showing the operation of the controller shown in FIG. 17. In this configuration example, parts of description similar to those of the first configuration example will be omitted as appropriate.

The controller CNT1 shown in FIG. 17 is so configured that the D flip-flop 26 is removed from the controller CNT1 shown in FIG. 15. In the controller CNT1 shown in FIG. 17, the AND gate 27 supplies an AND of the periodic signal S1 and an output of the D flip-flop 30 to the set terminal (S terminal) of the RS flip-flop 24.

When a zero-crossing point of the inductor current IL is detected after generation of a pulse in the periodic signal S1, the controller CNT1 shown in FIG. 17 starts the fourth state ST4 at a time point of generation of a next pulse in the periodic signal S1 after the time point of detection of the zero-crossing point of the inductor current IL. Thus, when the zero-crossing point of the inductor current IL is detected after generation of a pulse in the periodic signal S1, i.e. under a heavy-load condition, the controller CNT1 can change the switching frequency in units of multiples of the frequency of the periodic signal S1. That is, the switching frequency can be set as discrete and restrictive ones.

Modified Examples of Sixth Embodiment

The switching power supply device according to the sixth embodiment is an improvement of the switching power supply device according to the first embodiment as described above. However, similar improvements may be made also on the switching power supply devices according to the second to fifth embodiments. Furthermore, modifications similar to those of the modified examples described in the first to fifth embodiments may also be made on the switching power supply device according to the sixth embodiment.

Seventh Embodiment

In the above-described controllers CNT1 according to the first to sixth embodiments, the fourth state ST4 is set constant in duration. Therefore, in the switching power supply devices according to the first to sixth embodiments, as the input voltage VIN varies, regenerated energy of the inductor current IL to be stored in the fourth state ST4 is no longer kept at a quantity appropriate for soft switching of the switch SW1. That is, the switching power supply devices according to the first to sixth embodiments deteriorate in efficiency as the input voltage VIN varies.

A switching power supply device according to a seventh embodiment is enabled to solve the foregoing problem of the switching power supply devices according to the first to sixth embodiments.

The switching power supply device according to the seventh embodiment is an improvement of the switching power supply device according to the first embodiment. Therefore, with respect to the seventh embodiment, no overlapping description will be repeated for such elements and features as are similar to those in the first embodiment.

The controller CNT1 according to the seventh embodiment repeats the first, second, third, and fourth states ST1, ST2, ST3, and ST4 at the fixed cycle. Accordingly, the switching power supply device according to the seventh embodiment is allowed to fix the switching frequency.

In the controller CNT1 according to the seventh embodiment, as the input voltage VIN is larger, the fourth state ST4 is longer in duration correspondingly. As a result, the switching voltage VSW becomes larger than the input voltage VIN at an end point of the later-described dead time period DT, making it possible to prevent the current from flowing from the inductor L1 via a parasitic diode of the first switch SW1 to the application terminal for the input voltage VIN. Thus, the switching power supply device according to the seventh embodiment is enabled to achieve high efficiency irrespective of the value of the input voltage VIN.

The controller CNT1 according to the seventh embodiment has a dead time period DT, in which the first and second switches SW1 and SW2 are kept off, provided between the fourth state ST4 and the first state ST1. Then, the controller CNT1 according to the seventh embodiment sets the length of the dead time period DT, as well as the length of the fourth state ST4 which results with the input voltage VIN being a constant value, to fixed values, respectively, so that the first state ST1 is started at a zero-crossing point of the inductor current IL under the condition that no component variations are involved. As a result of this, the switching power supply device according to the seventh embodiment is enabled to reduce loss involved in turn-on of the first switch SW1, contributing to achievement of even higher efficiency.

<<First Configuration Example of Controller According to Seventh Embodiment>>

Figure 19:
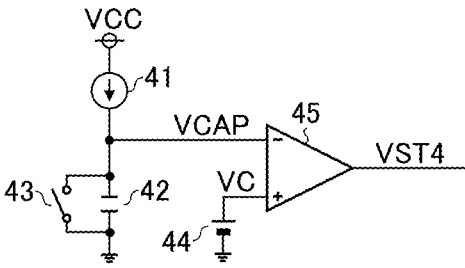
FIG. 19 is a diagram showing a first configuration example of a setting circuit according to a seventh embodiment.
Figure 20:
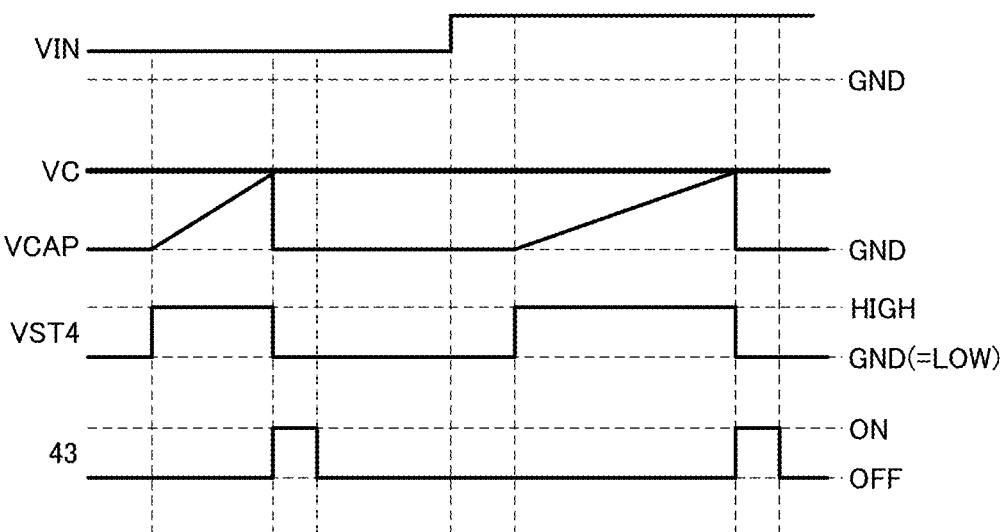
FIG. 20 is a timing chart showing the operation of the setting circuit shown in FIG. 19.

FIG. 19 is a diagram showing a first configuration example of a setting circuit according to the seventh embodiment. FIG. 20 is a timing chart showing the operation of the setting circuit shown in FIG. 19.

The first configuration example of the controller CNT1 according to the seventh embodiment includes the setting circuit shown in FIG. 19. The setting circuit shown in FIG. 19 includes a current source 41, a capacitor 42, a short-circuit switch 43, a voltage source 44, and a comparator 45.

The current source 41 outputs a current inversely proportional to the input voltage VIN.

The capacitor 42 is electrically charged by the current source 41. During charging of the capacitor 42, a charging voltage VCAP of the capacitor 42 increases at a gradient inversely proportional to the input voltage VIN.

When the charging voltage VCAP of the capacitor 42 is beyond a constant voltage VC, the short-circuit switch 43 is turned on, causing the capacitor 42 to be short-circuited thereacross and discharged.

The voltage source 44 outputs the constant voltage VC.

The comparator 45 outputs a voltage VST4 which is a comparison result between the capacitor charging voltage VCAP and the constant voltage VC. In the first configuration example of the controller CNT1 according to the seventh embodiment, a period in which the voltage VST4 keeps high is assigned as the fourth state.

<<Second Configuration Example of Controller According to Seventh Embodiment>>

Figure 21:
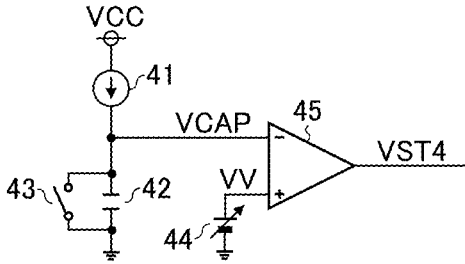
FIG. 21 is a diagram showing a second configuration example of the setting circuit according to the seventh embodiment.
Figure 22:
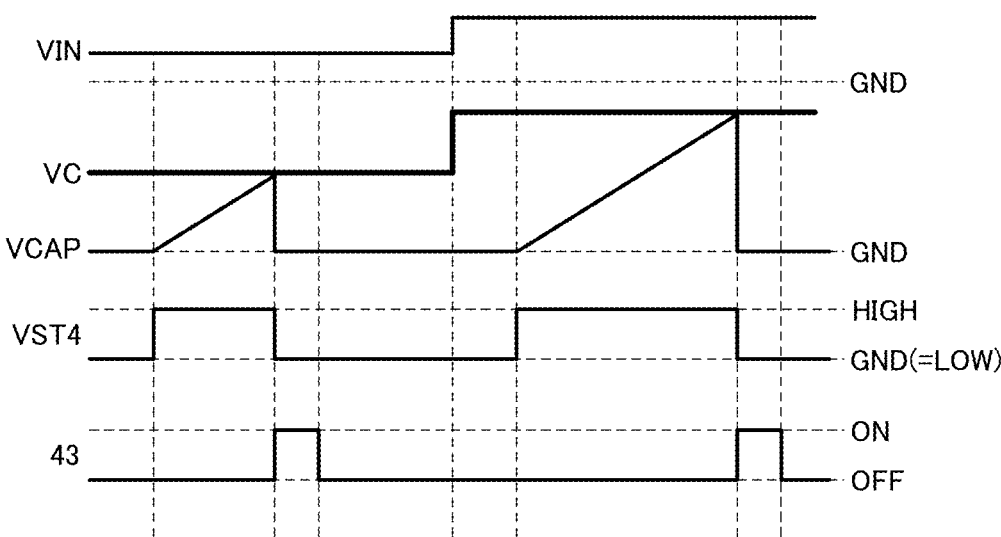
FIG. 22 is a timing chart showing the operation of the setting circuit shown in FIG. 21.

FIG. 21 is a diagram showing a second configuration example of the setting circuit according to the seventh embodiment. FIG. 22 is a timing chart showing the operation of the setting circuit shown in FIG. 21.

The second configuration example of the controller CNT1 according to the seventh embodiment includes the setting circuit shown in FIG. 21. The setting circuit shown in FIG. 21 includes a current source 41, a capacitor 42, a short-circuit switch 43, a voltage source 44, and a comparator 45.

The current source 41 outputs a constant current.

The capacitor 42 is electrically charged by the current source 41. During charging of the capacitor 42, the charging voltage VCAP of the capacitor 42 increases at a constant gradient.

When the charging voltage VCAP of the capacitor 42 is beyond a variable voltage VV, the short-circuit switch 43 is turned on, causing the capacitor 42 to be short-circuited thereacross and discharged.

The voltage source 44 outputs the variable voltage VV proportional to the input voltage VIN.

The comparator 45 outputs a voltage VST4 which is a comparison result between the capacitor charging voltage VCAP and the variable voltage VV. In the second configuration example of the controller CNT1 according to the seventh embodiment, a period in which the voltage VST4 keeps high is assigned as the fourth state.

Modified Examples of Seventh Embodiment

The switching power supply device according to the seventh embodiment is an improvement of the switching power supply device according to the first embodiment as described above. However, similar improvements may be made also on the switching power supply devices according to the second to sixth embodiments. Furthermore, modifications similar to those of the modified examples described in the first to sixth embodiments may also be made on the switching power supply device according to the seventh embodiment.

Eighth Embodiment

Each controller CNT1 of the switching power supply devices according to the fifth to seventh embodiments sets the length of the dead time period DT to a fixed value. In the switching power supply devices according to the fifth to seventh embodiments, there is a fear that the length of the dead time period DT may depart from proper length due to component variations, involving larger loss in turn-on of the switch SW1 and leading to efficiency deterioration.

A switching power supply device according to an eighth embodiment is enabled to solve the foregoing problem of the switching power supply devices according to the fifth to seventh embodiments.

The switching power supply device according to the eighth embodiment is an improvement of the switching power supply device according to the first embodiment. Therefore, with respect to the eighth embodiment, no overlapping description will be repeated for such elements and features as are similar to those in the first embodiment.

The controller CNT1 according to the eighth embodiment repeats the first, second, third, and fourth states ST1, ST2, ST3, and ST4 at a fixed cycle. Accordingly, the switching power supply device according to the eighth embodiment is allowed to fix the switching frequency.

The controller CNT1 according to the eighth embodiment has a dead time period DT, in which the first and second switches SW1 and SW2 are kept off, provided between the fourth state ST4 and the first state ST1. Then, the controller CNT1 according to the eighth embodiment sets the length of the fourth state ST4 to a fixed value. Also, the controller CNT1 according to the eighth embodiment adjusts the length of the dead time period. As a result of this, the switching power supply device according to the eighth embodiment is enabled to reduce loss involved in turn-on of the first switch SW1 even under the condition that component characteristics are varied. Thus, the switching power supply device according to the eighth embodiment can achieve even higher efficiency even under the condition that component characteristics are varied.

<<First Configuration Example of Controller According to Eighth Embodiment>>

Figure 23:
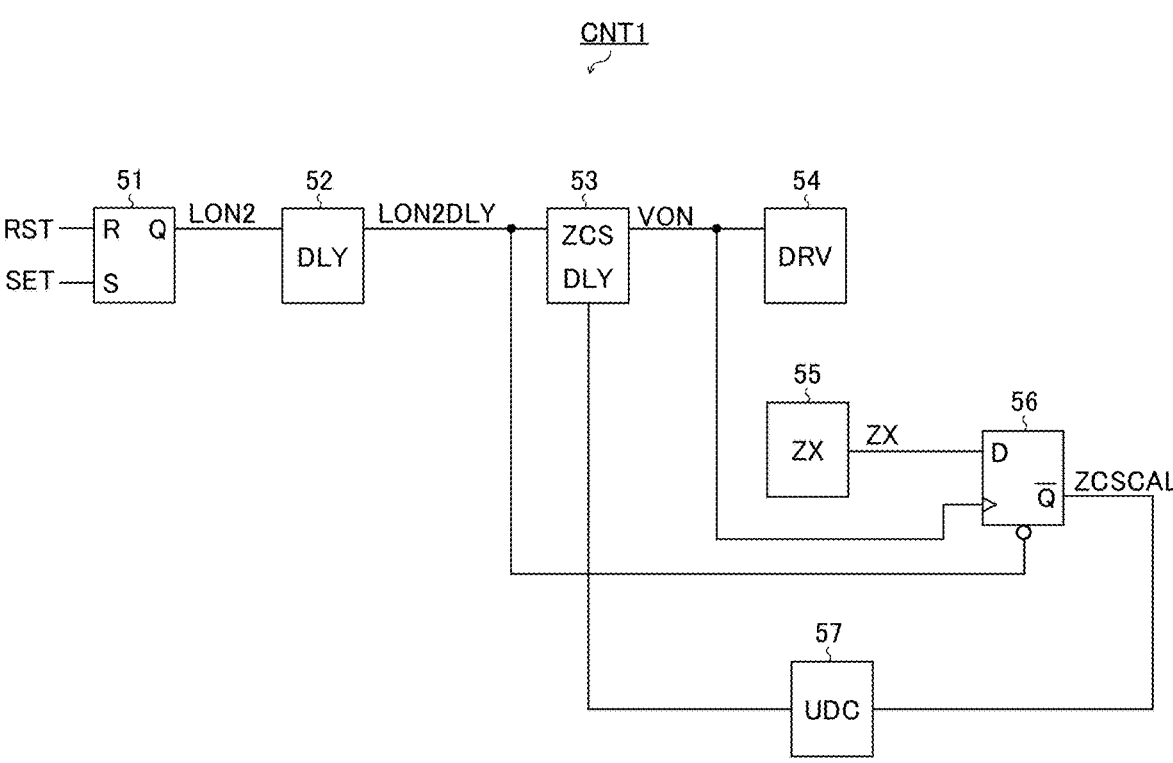
FIG. 23 is a diagram showing a first configuration example of a controller according to an eighth embodiment.
Figure 24:
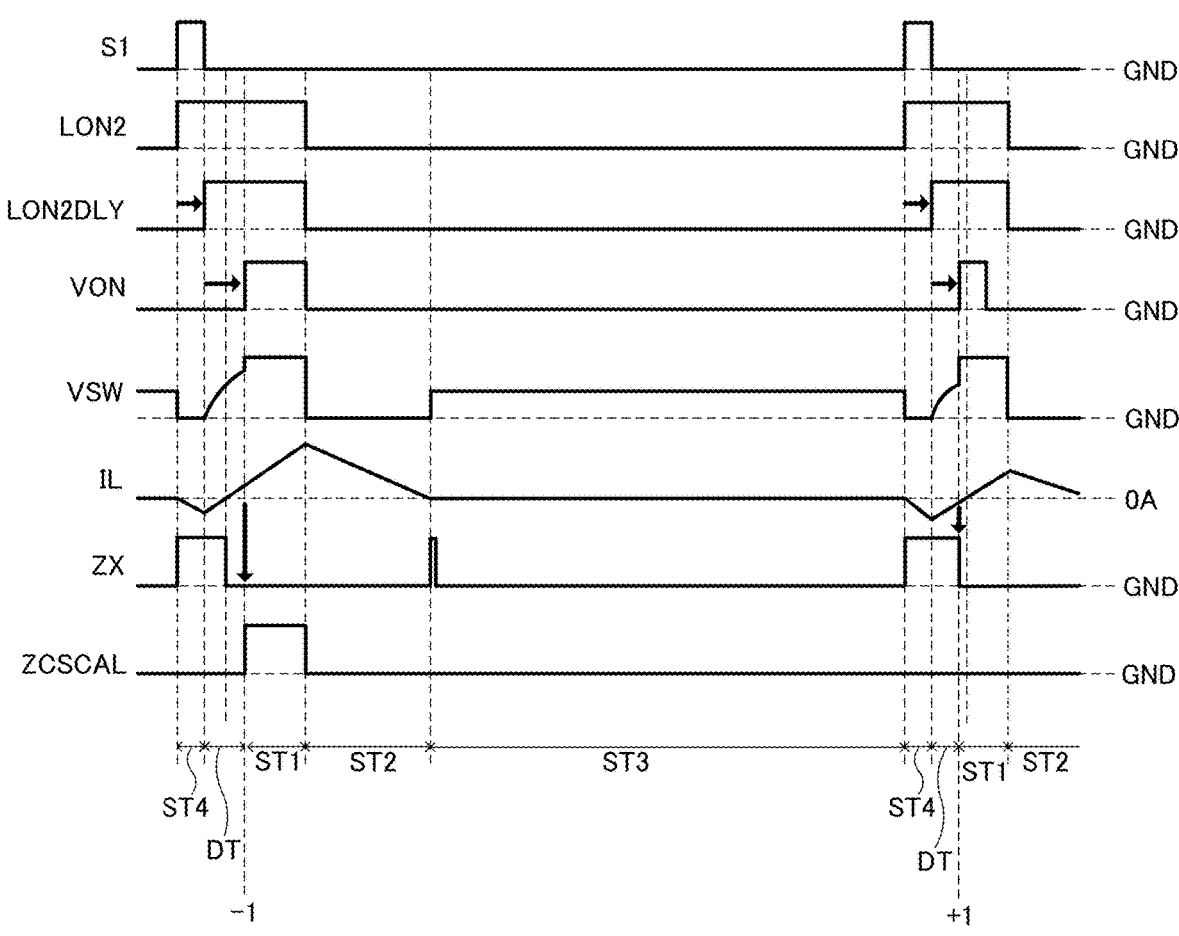
FIG. 24 is a timing chart showing the operation of the controller shown in FIG. 23.

FIG. 23 is a diagram showing a first configuration example of the controller CNT1 according to the eighth embodiment. FIG. 24 is a timing chart showing the operation of the controller CNT1 shown in FIG. 23.

The controller CNT1 shown in FIG. 23 includes a latch circuit 51, a delay circuit 52, a zero-current switch delay circuit 53, a driver 54, a zero-crossing point detection circuit 55, a latch circuit 56, and an up/down counter 57. In the configuration shown in FIG. 23, an RS flip-flop is used as an example of the latch circuit 51, and a D flip-flop is used as an example of the latch circuits 56. Therefore, in the following description, the latch circuit 51 will be referred to as RS flip-flop 51, and the latch circuit 56 referred to as D flip-flop 56.

The RS flip-flop 51 generates and outputs a signal LON2 which is set by a set signal SET supplied to the set terminal (S terminal) and which is reset by a reset signal RST supplied to the reset terminal (R terminal). In this configuration example, the periodic signal S1 is used as the set signal SET, and the PWM signal VPWM generated in the same manner as shown in FIG. 9 is used as the reset signal RST.

The delay circuit 52 generates a delay signal LON2DLY which allows the rising edge of the signal LON2 to be delayed by a specified time, and which prohibits the falling edge of the signal LON2 from being delayed. The above-mentioned specified time equals the length of the fourth state ST4.

The zero-current switch delay circuit 53 generates an on-time setting voltage VON which results from delaying the delay signal LON2DLY by a variable time. This variable time equals the length of the dead time period DT. As the count value of the up/down counter 57 is larger, the variable time is longer correspondingly.

The driver 54 controls the first and second switches SW1 and SW2 based on the on-time setting voltage VON.

The zero-crossing point detection circuit 55 detects a zero-crossing point of the inductor current IL, and outputs a zero-crossing point detection signal ZX. The zero-crossing point detection signal ZX outputted from the zero-crossing point detection circuit 55 goes high for negative level of the inductor current IL, and goes low for other than negative level of the inductor current IL.

The D flip-flop 56 holds the zero-crossing point detection signal ZX in synchronization with the on-time setting voltage VON, and outputs an inverted signal of the held zero-crossing point detection signal ZX. The inverted signal of the zero-crossing point detection signal ZX held by the D flip-flop 56 is a signal ZCSCAL. The delay signal LON2DLY is supplied to the clear terminal of the D flip-flop 56. The D flip-flop 56 is cleared when the delay signal LON2DLY is low, and the D flip-flop 56 is not cleared when the delay signal LON2DLY is high.

The up/down counter 57 decrements the count value by one when the signal ZCSCAL is high at the rising edge of the on-time setting voltage VON, and the up/down counter 57 increments the count value by one when the signal ZCSCAL is low at the rising edge of the on-time setting voltage VON.

When the inductor current IL is negative at an end point of the dead time period DT, the controller CNT1 shown in FIG. 23 prolongs the length of the next dead time period DT, and when the inductor current IL is positive at an end point of the dead time period DT, the controller CNT1 shortens the next dead time period DT. Thus, the controller CNT1 shown in FIG. 23 is enabled to make the timing of turn-on of the first switch SW1 proximate to a zero-crossing point of the inductor current IL.

<<Second Configuration Example of Controller According to Eighth Embodiment>>

Figure 25:
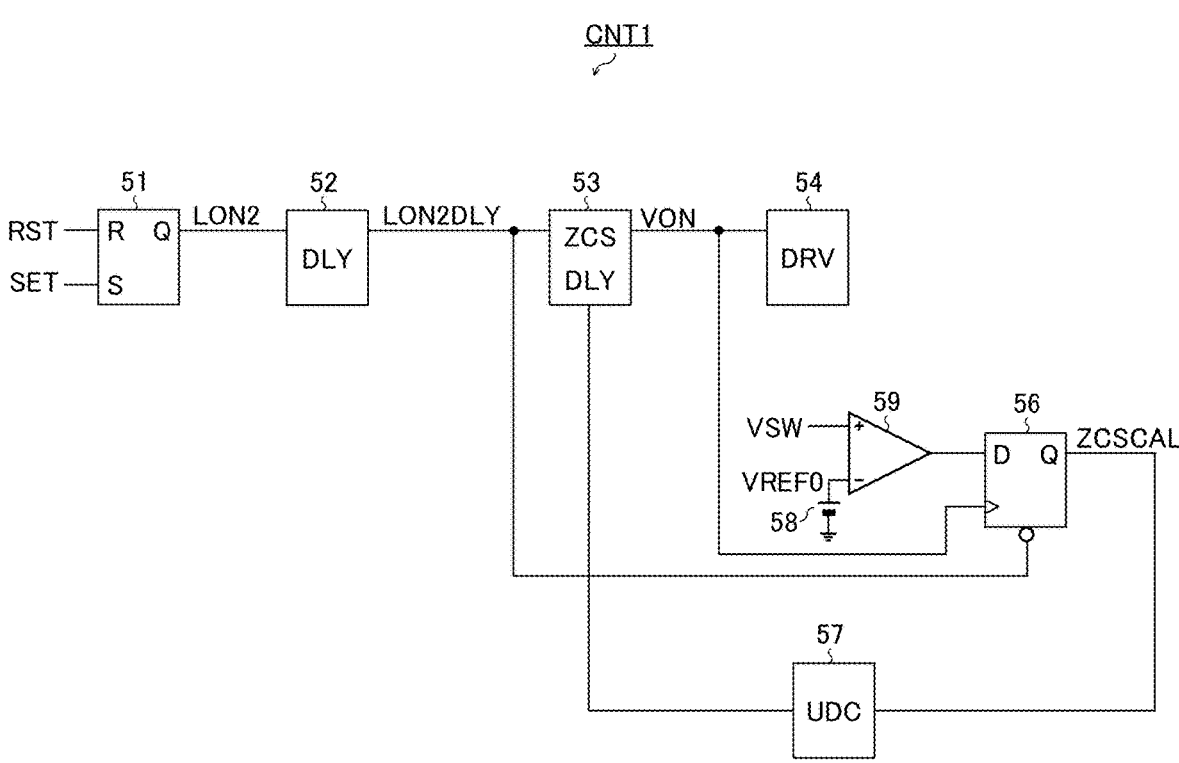
FIG. 25 is a diagram showing a second configuration example of the controller according to the eighth embodiment.
Figure 26:
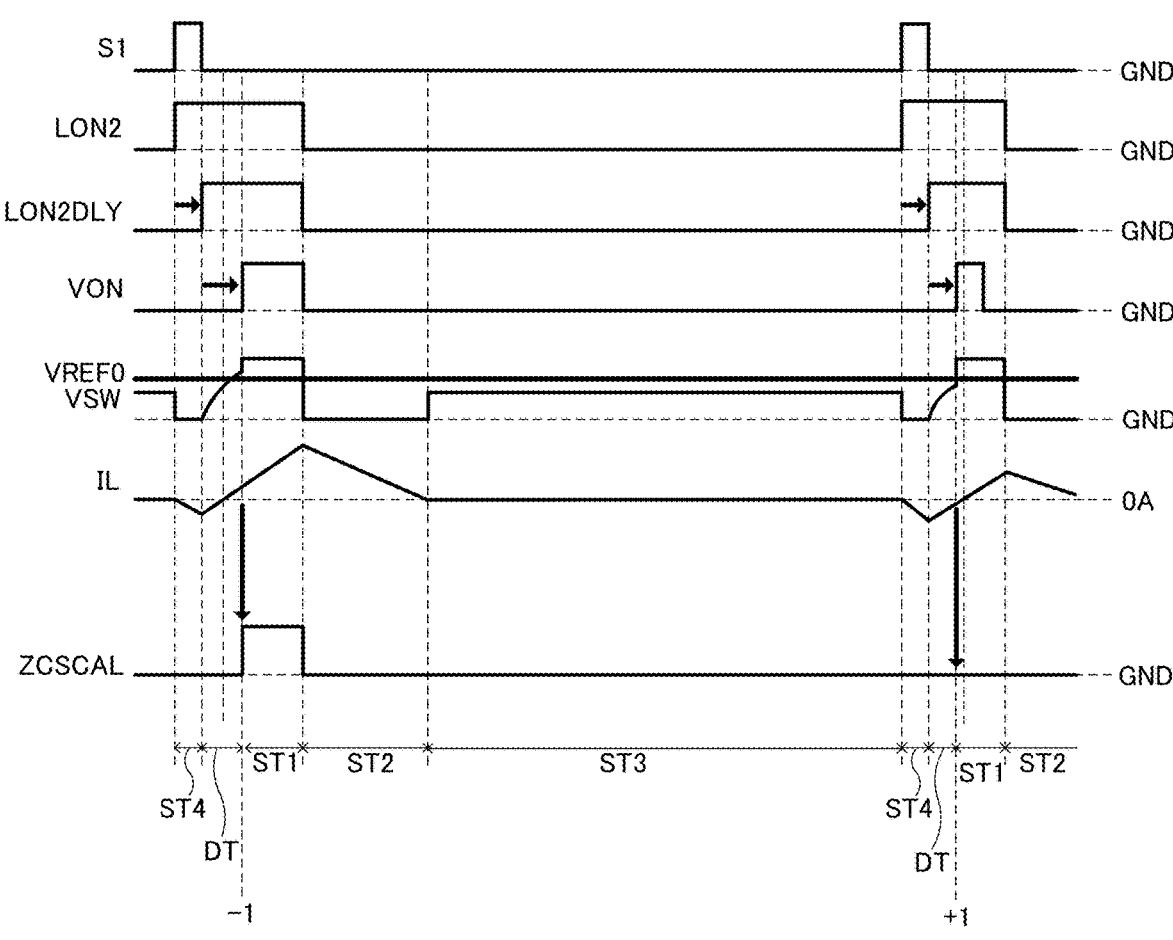
FIG. 26 is a timing chart showing the operation of the controller shown in FIG. 25.

FIG. 25 is a diagram showing a second configuration example of the controller CNT1 according to the eighth embodiment. FIG. 26 is a timing chart showing the operation of the controller CNT1 shown in FIG. 25. In this configuration example, parts of description similar to those of the first configuration example will be omitted as appropriate.

The controller CNT1 shown in FIG. 25 is so configured that the zero-crossing point detection circuit 55 is removed from the controller CNT1 shown in FIG. 23 while a voltage source 58 and a comparator 59 are added and moreover the signal ZCSCAL is assigned as the zero-crossing point detection signal ZX held by the D flip-flop 56. In the controller CNT1 shown in FIG. 25, the comparator 59 supplies the D terminal of the D flip-flop 56 with a comparison result between the switching voltage VSW and the reference voltage VREF0 outputted from the voltage source 58.

The controller CNT1 shown in FIG. 25 prolongs the length of the next dead time period DT when the switching voltage VSW is smaller than the reference voltage VREF0 at an end point of the dead time period DT, and shortens the length of the next dead time period DT when the switching voltage VSW is larger than the reference voltage VREF0 at an end point of the dead time period DT. Therefore, the controller CNT1 shown in FIG. 25 is enabled to make the timing of turn-on of the first switch SW1 proximate to a zero-crossing point of the inductor current IL.

<<Third Configuration Example of Controller According to Eighth Embodiment>>

Figure 27:
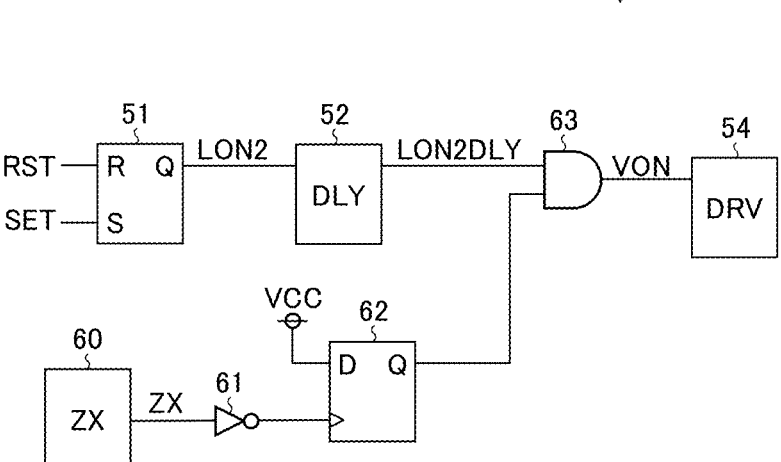
FIG. 27 is a diagram showing a third configuration example of the controller according to the eighth embodiment.
Figure 28:
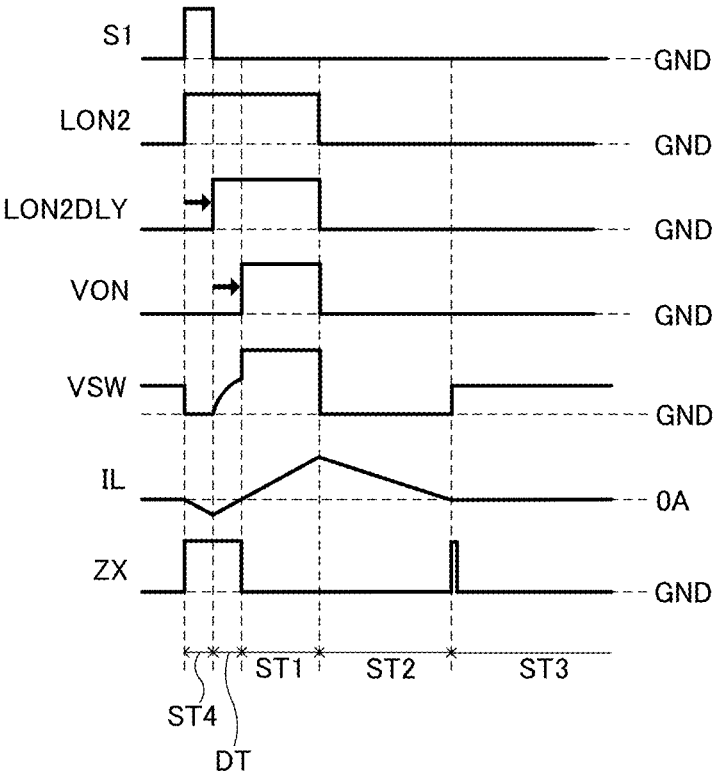
FIG. 28 is a timing chart showing the operation of the controller shown in FIG. 27.

FIG. 27 is a diagram showing a third configuration example of the controller CNT1 according to the eighth embodiment. FIG. 28 is a timing chart showing the operation of the controller CNT1 shown in FIG. 27.

The controller CNT1 shown in FIG. 27 includes a latch circuit 51, a delay circuit 52, a driver 54, a zero-crossing point detection circuit 60, a NOT gate 61, a latch circuit 62, and an AND gate 63. In the configuration shown in FIG. 27, an RS flip-flop is used as an example of the latch circuit 51, and a D flip-flop is used as an example of the latch circuits 62. Therefore, in the following description, the latch circuit 51 will be referred to as RS flip-flop 51, and the latch circuit 62 referred to as D flip-flop 62.

The RS flip-flop 51 generates and outputs a signal LON2 which is set by a set signal SET supplied to the set terminal (S terminal) and which is reset by a reset signal RST supplied to the reset terminal (R terminal). In this configuration example, the periodic signal S1 is used as the set signal SET, and the PWM signal VPWM generated in the same manner as shown in FIG. 9 is used as the reset signal RST.

The delay circuit 52 generates a delay signal LON2DLY which results from delaying the signal LON2 by a specified time. This specified time equals the length of the fourth state ST4.

The zero-crossing point detection circuit 60 detects a zero-crossing point of the inductor current IL, and outputs a zero-crossing point detection signal ZX. The zero-crossing point detection signal ZX outputted from the zero-crossing point detection circuit 60 goes high for negative level of the inductor current IL, and goes low for other than negative level of the inductor current IL.

The NOT gate 61 inverts the zero-crossing point detection signal ZX outputted from the zero-crossing point detection circuit 60. The D flip-flop 62 holds the voltage VCC supplied to the D terminal in synchronization with the inverted signal of the zero-crossing point detection signal ZX, and outputs the held voltage VCC. The voltage VCC supplied to the D terminal of the D flip-flop 62 is set to a value which is to be processed as a high-level signal in the AND gate 63.

The AND gate 63 generates an on-time setting voltage VON which is an AND of the delay signal LON2DLY and an output of the D flip-flop 62.

The driver 54 controls the first and second switches SW1 and SW2 based on the on-time setting voltage VON.

The controller CNT1 shown in FIG. 27 starts the first state ST1 at a zero-crossing point of the inductor current IL. Therefore, the controller CNT1 shown in FIG. 27 is enabled to make the timing of turn-on of the first switch SW1 approximately coincident with a zero-crossing point of the inductor current IL.

Modified Example of Eighth Embodiment

The switching power supply device according to the eighth embodiment is an improvement of the switching power supply device according to the first embodiment as described above. However, similar improvements may be made also on the switching power supply devices according to the second to seventh embodiments. Furthermore, modifications similar to those of the modified examples described in the first to seventh embodiments may also be made on the switching power supply device according to the eighth embodiment.

Ninth Embodiment

In each controller CNT1 of the switching power supply devices according to the fifth, sixth and eighth embodiments, the length of the fourth state ST4 is set to a fixed value. Also, in the controller CNT1 of the switching power supply device according to the seventh embodiment, the length of the fourth state ST4 is kept constant unless the input voltage VIN varies. For this reason, in the switching power supply devices according to the fifth to eighth embodiments, there is a fear that the length of the fourth state ST4 may depart from proper length due to component variations, involving larger loss in turn-on of the switch SW1 and leading to efficiency deterioration. In particular, in a case where the length of the fourth state ST4 is excessively long such that regenerated energy stored in the inductor L1 under the fourth state ST4 becomes excessively large, the switching voltage VSW at an end point of the dead time period DT becomes larger than the input voltage VIN. Thus, when the switching voltage VSW at an end point of the dead time period DT becomes larger than the input voltage VIN, a current flows from the inductor L1 via a parasitic diode of the first switch SW1 to the application terminal for the input voltage VIN, resulting in efficiency deterioration.

The switching power supply device according to a ninth embodiment is enabled to solve the foregoing problem of the switching power supply devices according to the fifth to eighth embodiments.

The switching power supply device according to the ninth embodiment is an improvement of the switching power supply device according to the first embodiment. Therefore, with respect to the ninth embodiment, no overlapping description will be repeated for such elements and features as are similar to those in the first embodiment.

The controller CNT1 according to the ninth embodiment repeats the first, second, third, and fourth states ST1, ST2, ST3, and ST4 at a fixed cycle. Accordingly, the switching power supply device according to the ninth embodiment is allowed to fix the switching frequency.

The controller CNT1 according to the ninth embodiment has a dead time period DT, in which the first and second switches SW1 and SW2 are kept off, provided between the fourth state ST4 and the first state ST1. Then, the controller CNT1 according to the ninth embodiment sets the length of the dead time period DT to a fixed value. Also, the controller CNT1 according to the ninth embodiment adjusts the length of the fourth state ST4. As a result of this, the switching power supply device according to the ninth embodiment is enabled to reduce loss involved in turn-on of the first switch SW1 even under the condition that component characteristics are varied. Thus, the switching power supply device according to the ninth embodiment is enabled to achieve even higher efficiency even with component characteristics varied.

<<First Configuration Example of Controller According to Ninth Embodiment>>

Figure 29:
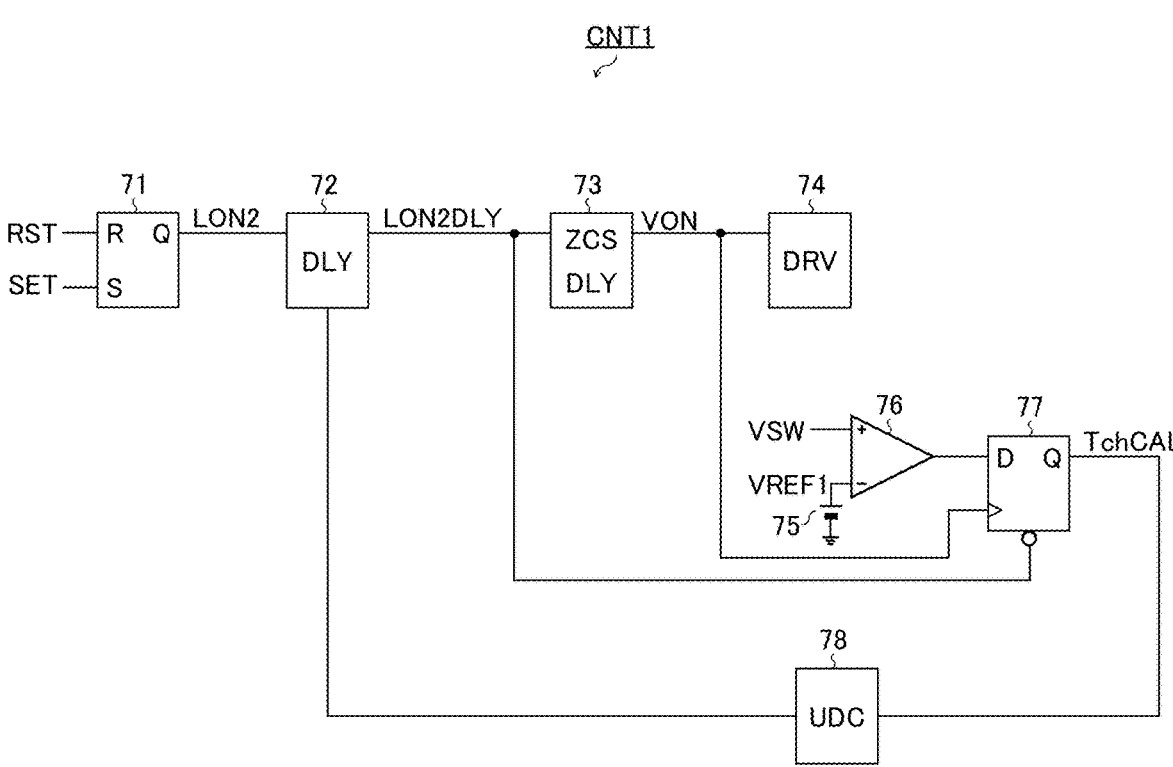
FIG. 29 is a diagram showing a first configuration example of a controller according to a ninth embodiment.
Figure 30:
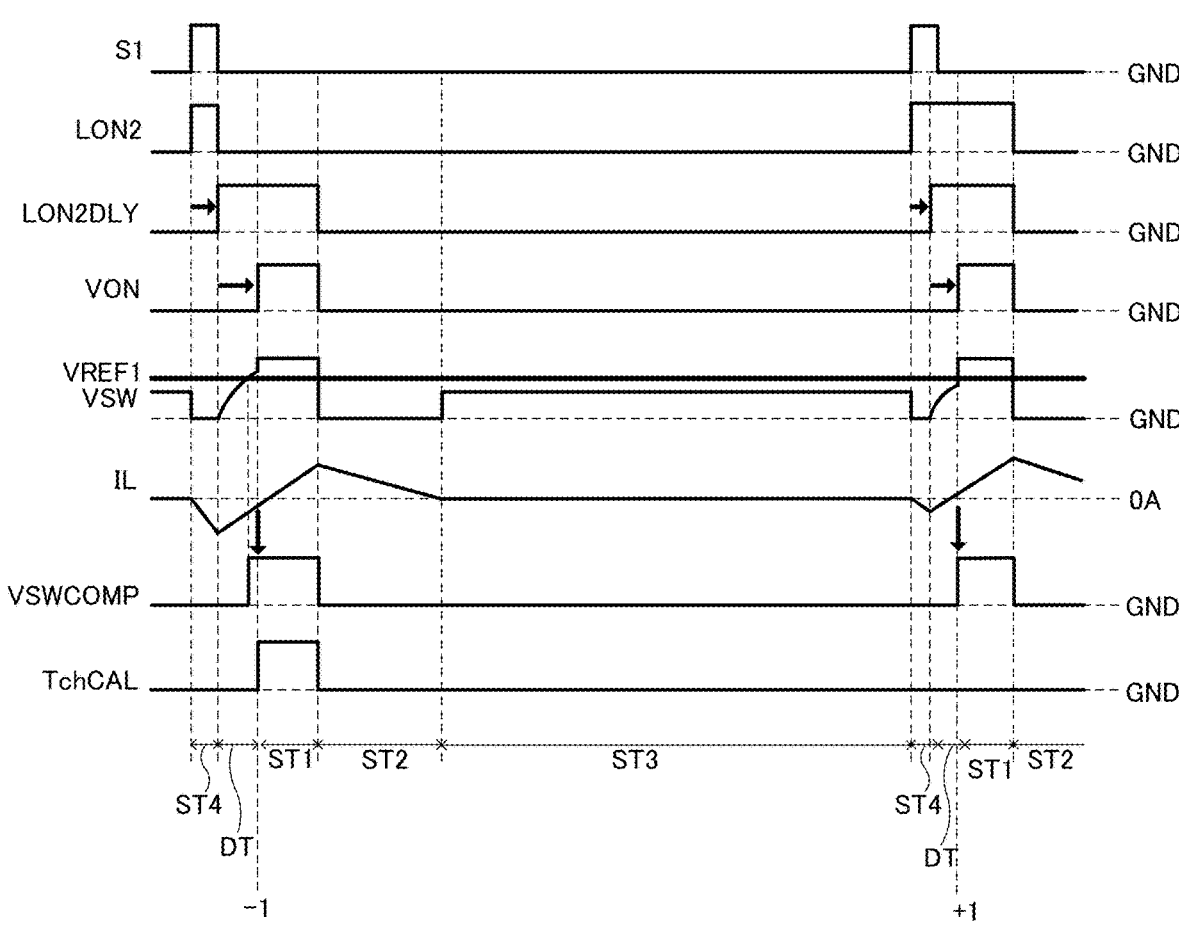
FIG. 30 is a timing chart showing the operation of the controller shown in FIG. 29.

FIG. 29 is a diagram showing a first configuration example of the controller CNT1 according to the ninth embodiment. FIG. 30 is a timing chart showing the operation of the controller CNT1 shown in FIG. 29.

The controller CNT1 shown in FIG. 29 includes a latch circuit 71, a delay circuit 72, a zero-current switch delay circuit 73, a driver 74, a voltage source 75, a comparator 76, a latch circuit 77, and an up/down counter 78. In the configuration shown in FIG. 29, an RS flip-flop is used as an example of the latch circuit 71, and a D flip-flop is used as an example of the latch circuit 77. Therefore, in the following description, the latch circuit 71 will be referred to as RS flip-flop 71, and the latch circuit 77 referred to as D flip-flop 77.

The RS flip-flop 71 generates and outputs a signal LON2 which is set by a set signal SET supplied to the set terminal (S terminal) and which is reset by a reset signal RST supplied to the reset terminal (R terminal). In this configuration example, the periodic signal S1 is used as the set signal SET, and the PWM signal VPWM generated in the same manner as shown in FIG. 9 is used as the reset signal RST.

The delay circuit 72 generates a delay signal LON2DLY which results from delaying the signal LON2 by a variable time. This variable time equals the length of the fourth state ST4. As the count value of the up/down counter 78 is larger, the variable time is longer correspondingly.

The zero-current switch delay circuit 73 generates an on-time setting voltage VON which results from delaying the delay signal LON2DLY by a specified time. This specified time equals the length of the dead time period DT.

The driver 74 controls the first and second switches SW1 and SW2 based on the on-time setting voltage VON.

The voltage source 75 outputs a reference voltage VREF1.

The comparator 76 supplies a comparison result between the switching voltage VSW and the reference voltage VREF1 to the D terminal of the D flip-flop 77.

The D flip-flop 77 holds a comparison result of the comparator 76 in synchronization with the on-time setting voltage VON, and outputs the held comparison result of the comparator 76. The comparison result of the comparator 76 held by the D flip-flop 77 is a signal TchCAL. The delay signal LON2DLY is supplied to the clear terminal of the D flip-flop 77. The D flip-flop 77 is cleared with the delay signal LON2DLY low, and the D flip-flop 77 is not cleared with the delay signal LON2DLY high.

The up/down counter 78 decrements the count value by one with the signal TchCAL high at the rising edge of the on-time setting voltage VON, and increments the count value by one with the signal TchCAL low at the rising edge of the on-time setting voltage VON.

When the switching voltage VSW is smaller than the reference voltage VREF1 at an end point of the dead time period DT, the controller CNT1 shown in FIG. 29 prolongs the length of the fourth state ST4. When the switching voltage VSW is larger than the reference voltage VREF1 at an end point of the dead time period DT, the controller CNT1 shortens the length of the fourth state ST4. Therefore, the controller CNT1 shown in FIG. 29 is enabled to make the switching voltage VSW at the timing of turn-on of the first switch SW1 proximate to the reference voltage VREF1.

<<Second Configuration Example of Controller According to Ninth Embodiment>>

Figure 31:
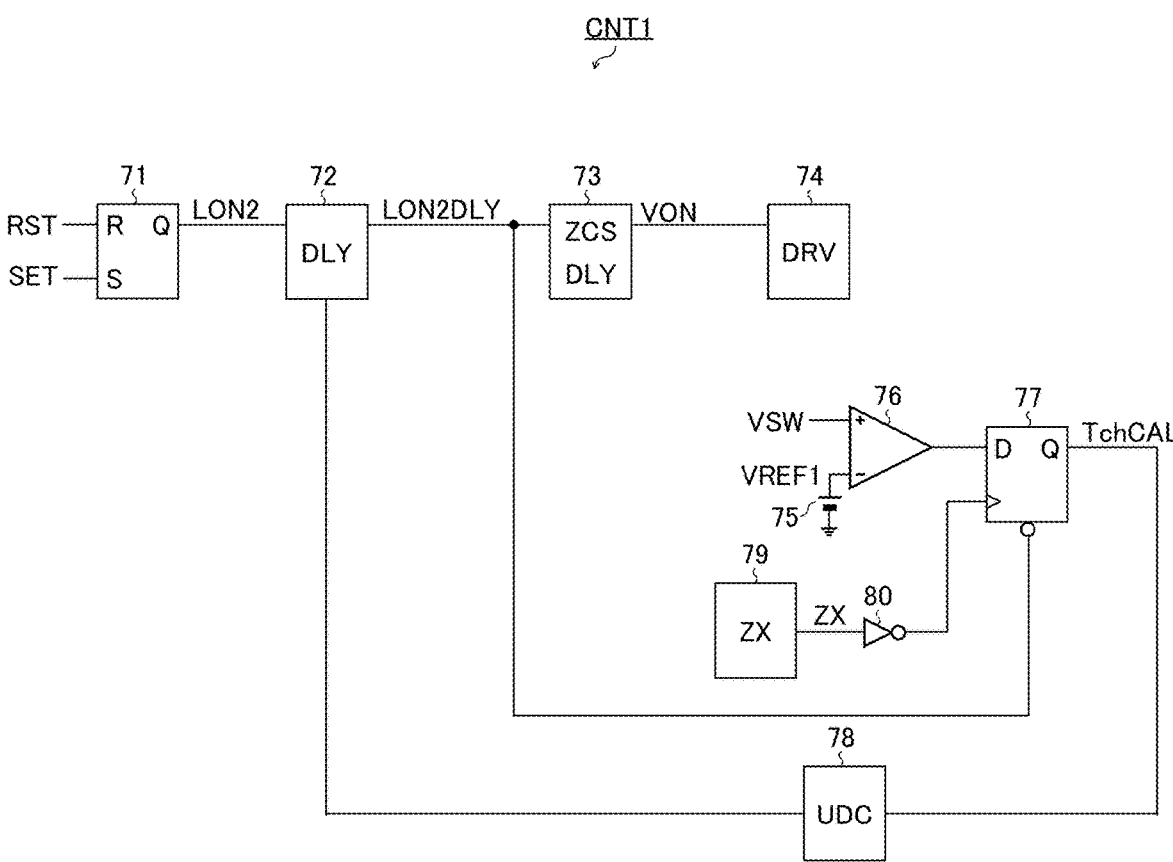
FIG. 31 is a diagram showing a second configuration example of the controller according to the ninth embodiment.
Figure 32:
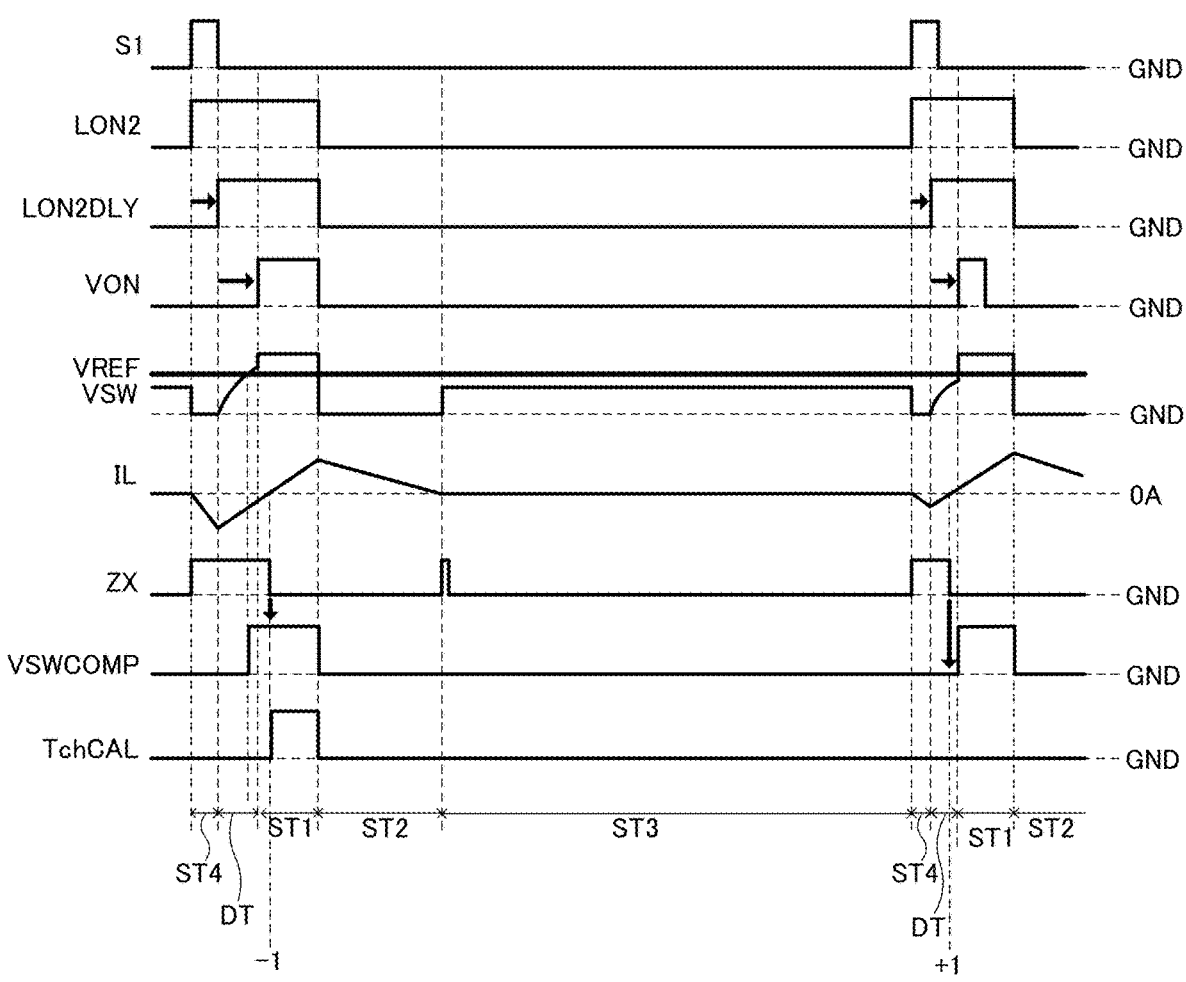
FIG. 32 is a timing chart showing the operation of the controller shown in FIG. 31.

FIG. 31 is a diagram showing a second configuration example of the controller CNT1 according to the ninth embodiment. FIG. 32 is a timing chart showing the operation of the controller CNT1 shown in FIG. 31.

The controller CNT1 shown in FIG. 31 is so configured that a zero-crossing point detection circuit 79 and a NOT gate 80 are added to the controller CNT1 shown in FIG. 29.

The zero-crossing point detection circuit 79 detects a zero-crossing point of the inductor current IL, and outputs a zero-crossing point detection signal ZX. The zero-crossing point detection signal ZX outputted from the zero-crossing point detection circuit 79 goes high with the inductor current IL negative, and goes low with the inductor current IL other than negative. The NOT gate 80 inverts the zero-crossing point detection signal ZX.

The D flip-flop 77 holds a comparison result of the comparator 76 in synchronization with inversion of the zero-crossing point detection signal ZX, and outputs the held comparison result of the comparator 76.

The up/down counter 78 decrements the count value by one with the signal TchCAL high at a zero-crossing point of the inductor current IL, and increments the count value by one with the signal TchCAL low at a zero-crossing point of the inductor current IL.

When the switching voltage VSW is smaller than the reference voltage VREF1 at a zero-crossing point of the inductor current IL, the controller CNT1 shown in FIG. 31 prolongs the length of the fourth state ST4. When the switching voltage VSW is larger than the reference voltage VREF1 at a zero-crossing point of the inductor current IL, the controller CNT1 shortens the length of the fourth state ST4. Therefore, the controller CNT1 shown in FIG. 31 is enabled to make the switching voltage VSW at the timing of turn-on of the first switch SW1 proximate to the reference voltage VREF1.

<<Third Configuration Example of Controller According to Ninth Embodiment>>

Figure 33:
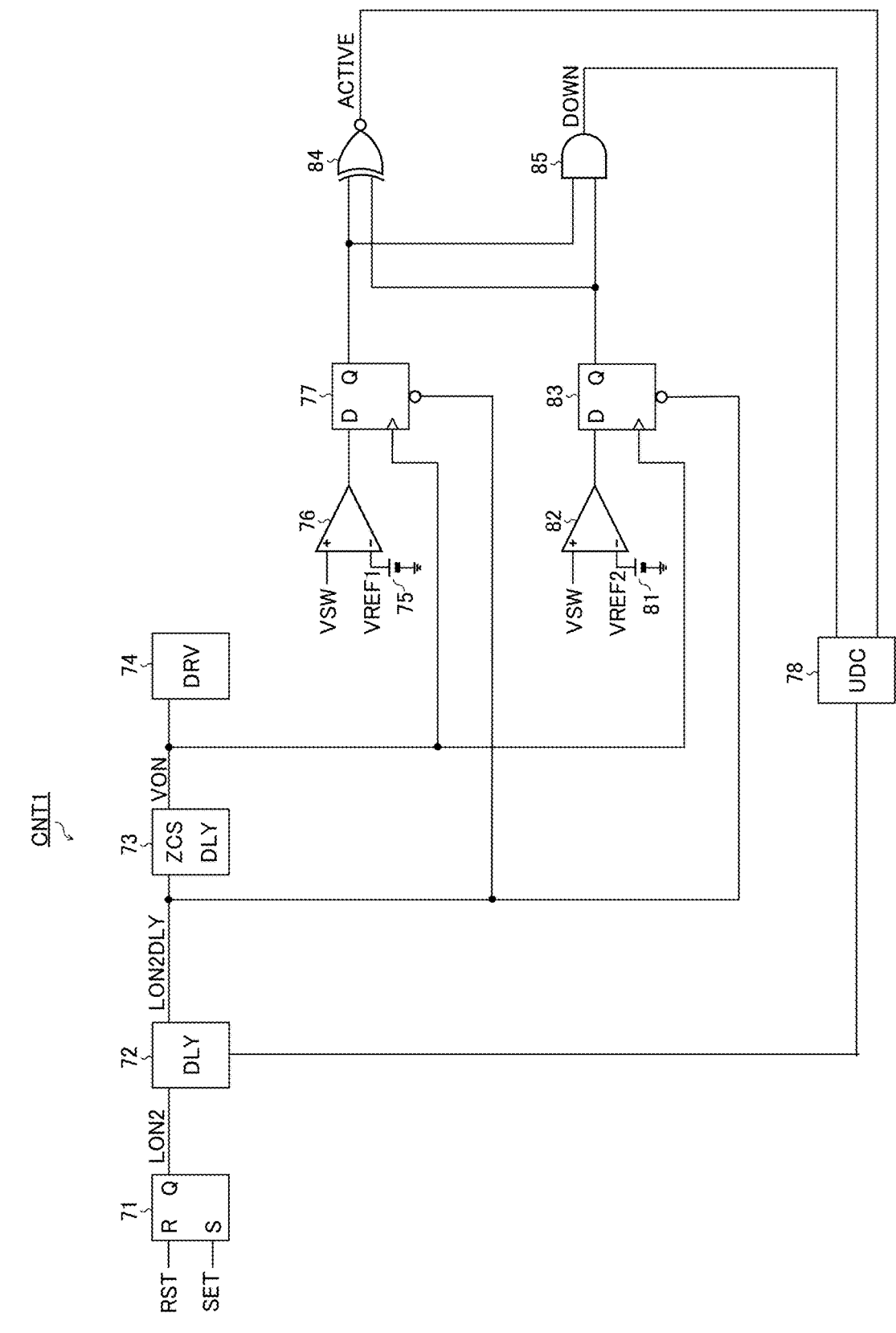
FIG. 33 is a diagram showing a third configuration example of the controller according to the ninth embodiment.
Figure 34:
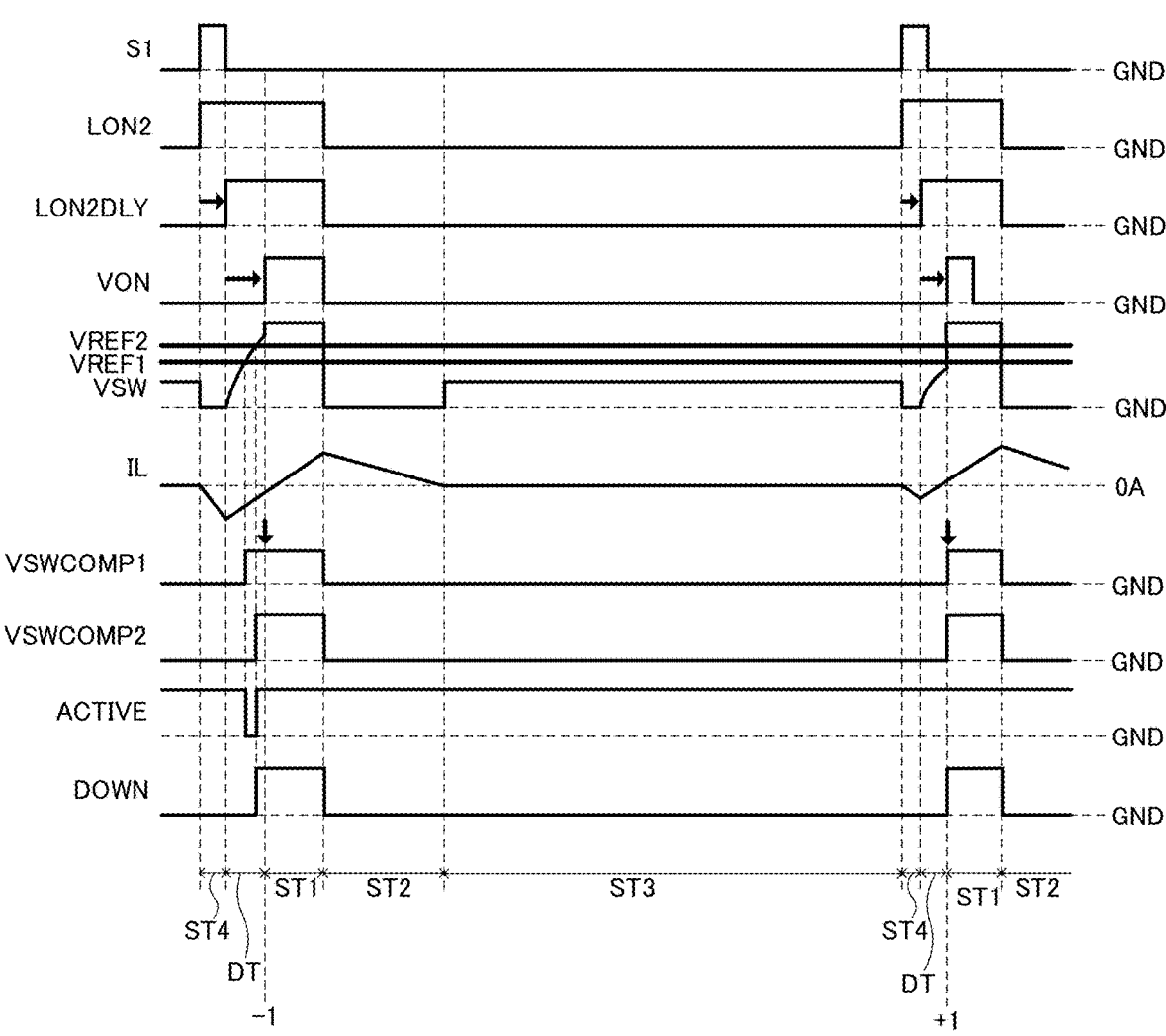
FIG. 34 is a timing chart showing the operation of the controller shown in FIG. 33.

FIG. 33 is a diagram showing a third configuration example of the controller CNT1 according to the ninth embodiment. FIG. 34 is a timing chart showing the operation of the controller CNT1 shown in FIG. 33.

The controller CNT1 shown in FIG. 33 is so configured that a voltage source 81, a comparator 82, a latch circuit 83, an EXOR gate 84, and an AND gate 85 are added to the controller CNT1 shown in FIG. 31. In the configuration shown in FIG. 33, a D flip-flop is used as an example of the latch circuit 83. Therefore, in the following description, the latch circuit 83 will be referred to as D flip-flop 83.

The voltage source 81 outputs a reference voltage VREF2. The reference voltage VREF2 is larger than the reference voltage VREF1.

The comparator 82 supplies a comparison result between the switching voltage VSW and the reference voltage VREF2 to the D terminal of the D flip-flop 83.

The D flip-flop 83 holds a comparison result of the comparator 82 in synchronization with the on-time setting voltage VON, and outputs the held comparison result of the comparator 82. The delay signal LON2DLY is supplied to the clear terminal of the D flip-flop 83. The D flip-flop 83 is cleared with the delay signal LON2DLY low, and the D flip-flop 83 is not cleared with the delay signal LON2DLY high.

The EXOR gate 84 generates a signal ACTIVE which is an inverted signal of an exclusive OR between an output of the D flip-flop 77 and an output of the D flip-flop 83, and outputs the signal ACTIVE to the up/down counter 78.

The AND gate 85 generates a signal DOWN which is an AND between an output of the D flip-flop 77 and an output of the D flip-flop 83, and outputs the signal DOWN to the up/down counter 78.

The up/down counter 78 performs no counting operation while the signal ACTIVE is low. The up/down counter 78 decrements the count value by one when the signal ACTIVE is high and the signal DOWN is high at a rising edge of the on-time setting voltage VON. Also, the up/down counter 78 increments the count value by one when the signal ACTIVE is high and the signal DOWN is low at a rising edge of the on-time setting voltage VON. In addition, at a timing when the up/down counter 78 is incrementing the count value by one in FIG. 34, the signal DOWN seems high at a glance. However, since the first switch SW1 is turned on slightly later than the rising edge of the on-time setting voltage VON, the switching voltage VSW abruptly increases slightly later than the rising edge of the on-time setting voltage VON. Thus, at the timing when the up/down counter 78 is incrementing the count value by one in FIG. 34, the switching voltage VSW is still less than the reference voltage VREF1, with the signal DOWN low.

When the switching voltage VSW is smaller than the reference voltage VREF1 at an end point of the dead time period DT, the controller CNT1 shown in FIG. 33 prolongs the length of the fourth state ST4. When the switching voltage VSW is larger than the reference voltage VREF2 at an end point of the dead time period DT, the controller CNT1 shortens the length of the fourth state ST4. Therefore, the controller CNT1 shown in FIG. 33 is enabled to make the switching voltage VSW at the timing of turn-on of the first switch SW1 proximate to a range from reference voltage VREF1 to reference voltage VREF2.

Modified Example of Ninth Embodiment

The switching power supply device according to the ninth embodiment is an improvement of the switching power supply device according to the first embodiment as described above. However, similar improvements may be made also on the switching power supply devices according to the second to eighth embodiments. Furthermore, modifications similar to those of the modified examples described in the first to eighth embodiments may also be made on the switching power supply device according to the ninth embodiment.

<Application>

Figure 35:
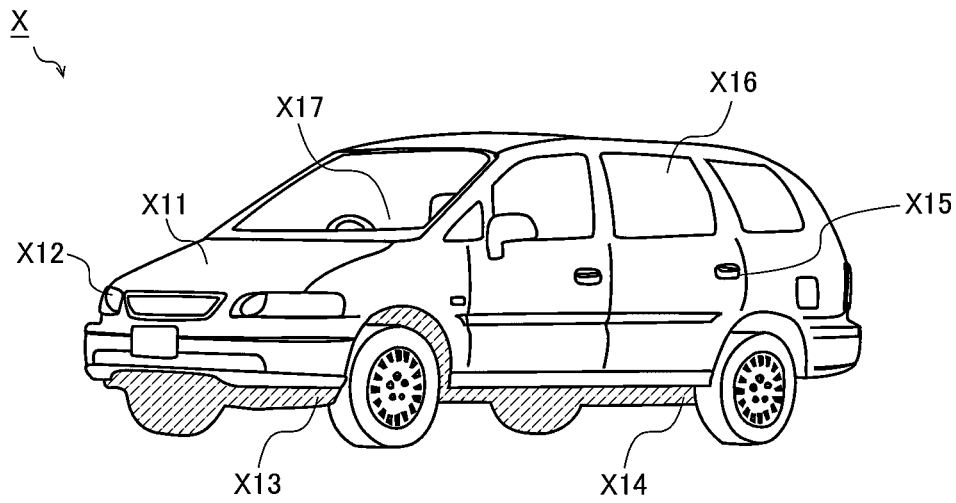
FIG. 35 is an exterior view showing one configuration example of a vehicle.

Next, the switching power supply device 1 described above will be described below on its application example. FIG. 35 is an exterior view showing one configuration example of a vehicle that incorporates a vehicle-mounted appliance. The vehicle X of this configuration example includes vehicle-mounted appliances X11 to X17 and a battery (not illustrated) that supplies those vehicle-mounted appliances X11 to X17 with electric power.

In a case where any of the switching power supply devices according to the first to ninth embodiments described above is incorporated in the vehicle X, it is required that noise emission in the AM band be reduced so as not to adversely affect reception of AM radio broadcasts. Accordingly, it is preferable that the switching control circuit 1 produce a voltage with a frequency of 1.8 MHz or higher but 2.1 MHz or lower at the connection node between the first and second switches SW1 and SW2 under a condition that at least the load LD1 is in a normal load state. That is, it is preferable that the switching control circuit 1 keeps the frequency of the switching voltage VSW (the switching frequency) in a range of 1.8 MHz or higher but 2.1 MHz or lower. A switching frequency lower than 1.8 MHz leads to increased noise emission in the AM band, and a switching frequency higher than 2.1 MHz leads to switching loss exceeding the permissible range.

The vehicle-mounted appliance X11 is an engine control unit that performs engine-related control (injection control, electronic throttle control, idling control, oxygen sensor heater control, automatic cruise control, etc.).

The vehicle-mounted appliance X12 is a lamp control unit that controls the lighting and extinguishing of HIDs (high-intensity discharged lamps), DRLs (daytime running lamps), and the like.

The vehicle-mounted appliance X13 is a transmission control unit that performs transmission-related control.

The vehicle-mounted appliance X14 is a body control unit that performs control related to the movement of the vehicle X (ABS [anti-lock brake system] control, EPS [electric power steering] control, electronic suspension control, and the like).

The vehicle-mounted appliance X15 is a security control unit that drives and controls door locks, burglar alarms, and the like.

The vehicle-mounted appliance X16 comprises electronic appliances incorporated in the vehicle X as standard or manufacturer-fitted equipment at the stage of factory shipment, such as wipers, power side mirrors, power windows, a power sun roof, power seats, and an air conditioner.

The vehicle-mounted appliance X17 comprises electronic appliances fitted to the vehicle X optionally as user-fitted equipment, such as vehicle-mounted A/V (audio/visual) equipment, a car navigation system, and an ETC (electronic toll control system).

Any of the switching power supply devices according to the first to ninth embodiments described above can be incorporated in any of the vehicle-mounted appliances X11 to X17.

<Notes>

The present invention can be implemented in any other manners than as in the embodiments described above without departure from the spirit of the invention. The embodiments described above should be considered to be in every aspect illustrative and not restrictive, and the technical scope of the present invention is defined not by the description of embodiments given above but by the scope of the appended claims and should be understood to encompass any modifications within a spirit and scope equivalent to the claims.

For example, the set value of the fixed cycle Tfix may be changeable. The set value of the fixed cycle Tfix can be changed by changing the period of the periodic signal S1.

A switching power supply device (1A to 1D) according to one aspect of what is described herein is configured to buck an input voltage to produce an output voltage, including: a first switch (SW1) of which a first terminal is configured to be connectable to an application terminal for the input voltage and of which a second terminal is configured to be connectable to a first terminal of an inductor (L1); a second switch (SW2) of which a first terminal is configured to be connectable to the first terminal of the inductor and to the second terminal of the first switch and of which a second terminal is configured to be connectable to an application terminal for a low voltage lower than the input voltage; and a controller (CNT1) configured to turn on and off the first and second switches, wherein the controller has a first state in which the controller keeps the first switch on and the second switch off, a second state in which the controller keeps the first switch off and the second switch on, a third state in which the controller keeps the first and second switches off, and a fourth state in which the controller keeps a voltage at a connection node between the first and second switches lower than in the third state; the controller repeats the first, second, third, and fourth states on a basis of a periodic signal; and the controller masks the periodic signal until detecting a zero-crossing point of a current flowing through the inductor (first configuration).

The switching power supply device of the first configuration can fulfill normal switching control easily even under a heavy-load condition, contributing to achievement of high efficiency.

In the switching power supply device of the first configuration, the controller may repeat the first, second, third, and fourth states in an order of the first to second to third to fourth states (second configuration).

The switching power supply device of the second configuration is enabled to suppress loss involved in turn-on of the first switch.

In the switching power supply device of the first or second configuration, the controller may repeat the first, second, third, and fourth states at a fixed cycle based on the periodic signal (third configuration).

The switching power supply device of the third configuration is enabled to suppress variations of the switching frequency.

In the switching power supply device of any one of the first to third configurations, when a zero-crossing point of a current flowing through the inductor is detected after generation of a pulse in the periodic signal, the controller may start the fourth state at a time point when a zero-crossing point of the current flowing through the inductor is detected (fourth configuration).

In the switching power supply device of the fourth configuration, in a case where a zero-crossing point of the current flowing through the inductor is detected after generation of a pulse in the periodic signal, i.e. under a heavy-load condition, the switching frequency can be changed in response to a magnitude of the load.

In the switching power supply device of any one of the first to third configurations, when a zero-crossing point of a current flowing through the inductor is detected after generation of a pulse in the periodic signal, the controller may start the fourth state at a time point of generation of a next pulse in the periodic signal later than the time point when the zero-crossing point of the current flowing through the inductor is detected (fifth configuration).

In the switching power supply device of the fifth configuration, when a zero-crossing point of the current flowing through the inductor is detected after generation of a pulse in the periodic signal, i.e. under a heavy-load condition, the switching frequency can be changed in units of multiples of the frequency of the periodic signal.

In the switching power supply device of any one of the first to fifth configurations, the controller may have a dead time period, in which the first and second switches are kept off, provided between the fourth state and the first state, and start the first state at a zero-crossing point of the current flowing through the inductor (sixth configuration).

The switching power supply device of the sixth configuration is enabled to reduce loss involved in turn-on of the first switch, contributing to achievement of even higher efficiency.

In the switching power supply device of any one of the first to sixth configurations, the controller, in the fourth state, may keep the first switch off and the second switch on (seventh configuration).

The switching power supply device of the seventh configuration is enabled to fulfill the fourth state by simple control.

The switching power supply device of any one of the first to seventh configurations may further include a third switch (SW3) which is configured to be connectable in parallel with the second switch and which has at least either of a lower on-state resistance and a lower capacitance than the second switch, wherein the controller is configured to turn on and off the third switch and, in the fourth state, the controller keeps the first switch off and the third switch on (eighth configuration).

The switching power supply device of the eighth configuration is enabled to reduce loss involved in the fourth state.

The switching power supply device of any one of the first to sixth configurations may further include: a third switch (SW3) of which a first terminal is configured to be connectable to the first terminal of the inductor and to the second terminal of the first switch; and a capacitance (C2) of which a first terminal is connected to a second terminal of the third switch and of which a second terminal is configured to be connectable to the application terminal for the low voltage, wherein the controller is configured to turn on and off the third switch, and in the fourth state, the controller keeps the first switch off and the third switch on (ninth configuration).

For the switching power supply device of the ninth configuration, through adjustment of the capacitance value of the capacitance, it is possible to adjust how the voltage at the connection node between the first and second switches rises immediately after an end of the fourth state.

The switching power supply device of the ninth configuration may further include a fourth switch (SW4) configured to be connectable in parallel with the capacitance, wherein the controller is configured to turn on and off the fourth switch, and the controller turns on and off the third and fourth switches complementarily (tenth configuration).

The switching power supply device of the tenth configuration is enabled to discharge the capacitance appropriately.

The switching power supply device of any one of the first to sixth configurations may further include a capacitance (C2) of which a first terminal is configured to be connectable to the first terminal of the inductor and to the second terminal of the first switch, and of which a second terminal is configured to be connectable to an application terminal for a variable voltage, wherein the controller is configured to control the variable voltage, and in the fourth state, the controller keeps the first switch off and, by controlling the variable voltage, produces a voltage difference between the first terminal and the second terminal of the capacitance (eleventh configuration).

For the switching power supply device of the eleventh configuration, through adjustment of the value of the variable voltage in the fourth state, it is possible to adjust how the voltage at the connection node between the first and second switches rises immediately after an end of the fourth state.

In the switching power supply device of any one of the first to eleventh configurations, a voltage with a frequency of 1.8 MHz or higher but 2.1 MHz or lower may be produced at the connection node between the first and second switches (twelfth configuration).

The switching power supply device of the twelfth configuration is enabled to suppress noise emission in the AM band. Also, the switching power supply device of the twelfth configuration is enabled to limit switching loss to within a permissible range.

According to one aspect of what is disclosed herein, a switch control device (CNT1) turns on and off: a first switch (SW1) of which a first terminal is configured to be connectable to an application terminal for an input voltage, and of which a second terminal is configured to be connectable to a first terminal of an inductor (L1); and a second switch (SW2) of which a first terminal is configured to be connectable to the first terminal of the inductor and to the second terminal of the first switch, and of which a second terminal is configured to be connectable to an application terminal for a low voltage lower than the input voltage, wherein the switch control device has a first state in which the switch control device keeps the first switch on and the second switch off, a second state in which the switch control device keeps the first switch off and the second switch on, a third state in which the switch control device keeps the first and second switches off, and a fourth state in which the switch control device keeps a voltage at a connection node between the first and second switches lower than in the third state; the switch control device repeats the first, second, third, and fourth states on a basis of a periodic signal; and the switch control device masks the periodic signal until detecting a zero-crossing point of a current flowing through the inductor (thirteenth configuration).

The switch control device of the thirteenth configuration is enabled to fulfill normal switching control easily even under a heavy-load condition, contributing to achievement of high efficiency.

According to one aspect of what is disclosed herein, a vehicle-mounted appliance (X11 to X17) includes the switching power supply device of any one of the first to twelfth configurations, or the switch control device of the thirteenth configuration (fourteenth configuration).

The switching power supply device or switch control device provided in the vehicle-mounted appliance of the fourteenth configuration is enabled to fulfill normal switching control easily even under a heavy-load condition, contributing to achievement of high efficiency.

A vehicle (X) according to one aspect of what is disclosed herein includes the vehicle-mounted appliance of the fourteenth configuration, and a battery for supplying the vehicle-mounted appliance with electric power (fifteenth configuration).

The switching power supply device or switch control device provided in the vehicle of the fifteenth configuration is enabled to fulfill normal switching control easily even under a heavy-load condition, contributing to achievement of high efficiency.

What is claimed is:

1. A switching power supply device configured to buck an input voltage to produce an output voltage, comprising:
  a first switch of which a first terminal is configured to be connectable to an application terminal for the input voltage, and of which a second terminal is configured to be connectable to a first terminal of an inductor;
  a second switch of which a first terminal is configured to be connectable to the first terminal of the inductor and to the second terminal of the first switch, and of which a second terminal is configured to be connectable to an application terminal for a low voltage lower than the input voltage; and a controller configured to turn on and off the first and second switches, wherein
  the controller has
    a first state in which the controller keeps the first switch on and the second switch off,
    a second state in which the controller keeps the first switch off and the second switch on,
    a third state in which the controller keeps the first and second switches off, and
    a fourth state in which the controller keeps a voltage at a connection node between the first and second switches lower than in the third state;
  the controller repeats the first, second, third, and fourth states on a basis of a periodic signal; and
  the controller masks the periodic signal until detecting a zero-crossing point of a current flowing through the inductor.

2. The switching power supply device according to claim 1, wherein the controller repeats the first, second, third, and fourth states in an order of the first to second to third to fourth states.

3. The switching power supply device according to claim 1, wherein the controller repeats the first, second, third, and fourth states at a fixed cycle based on the periodic signal.

4. The switching power supply device according to claim 1, wherein when a zero-crossing point of a current flowing through the inductor is detected after generation of a pulse in the periodic signal, the controller starts the fourth state at a time point when the zero-crossing point of the current flowing through the inductor is detected.

5. The switching power supply device according to claim 1, wherein when a zero-crossing point of a current flowing through the inductor is detected after generation of a pulse in the periodic signal, the controller starts the fourth state at a time point of generation of a next pulse in the periodic signal later than a time point when the zero-crossing point of the current flowing through the inductor is detected.

6. The switching power supply device according to claim 1, wherein
  the controller
    has a dead time period, in which the first and second switches are kept off, provided between the fourth state and the first state, and
    starts the first state at a zero-crossing point of the current flowing through the inductor.

7. The switching power supply device according to claim 1, wherein in the fourth state, the controller keeps the first switch off and the second switch on.

8. The switching power supply device according to claim 1, further comprising a third switch which is configured to be connectable in parallel with the second switch and which has at least either of a lower on-state resistance and a lower capacitance than the second switch, wherein
  the controller is configured to turn on and off the third switch, and
  in the fourth state, the controller keeps the first switch off and the third switch on.

9. The switching power supply device according to claim 1, further comprising:
  a third switch of which a first terminal is configured to be connectable to the first terminal of the inductor and to the second terminal of the first switch, and
  a capacitance of which a first terminal is connected to a second terminal of the third switch and of which a second terminal is configured to be connectable to the application terminal for the low voltage, wherein the controller is configured to turn on and off the third switch, and in the fourth state, the controller keeps the first switch off and the third switch on.

10. The switching power supply device according to claim 9, further comprising a fourth switch configured to be connectable in parallel with the capacitance, wherein the controller is configured to turn on and off the fourth switch, and the controller turns on and off the third and fourth switches complementarily.

11. The switching power supply device according to claim 1, further comprising a capacitance of which a first terminal is configured to be connectable to the first terminal of the inductor and to the second terminal of the first switch, and of which a second terminal is configured to be connectable to an application terminal for a variable voltage, wherein the controller is configured to control the variable voltage, and in the fourth state, the controller keeps the first switch off and, by controlling the variable voltage, produces a voltage difference between the first terminal and the second terminal of the capacitance.

12. The switching power supply device according to claim 1, wherein when a zero-crossing point of a current flowing through the inductor is detected before generation of a pulse in the periodic signal, a voltage with a frequency of 1.8 MHz or higher but 2.1 MHz or lower is produced at the connection node between the first and second switches.

13. A vehicle-mounted appliance, comprising the switching power supply device according to claim 1.

14. A vehicle, comprising:

the vehicle-mounted appliance according to claim 13; and a battery for supplying the vehicle-mounted appliance with electric power.

15. A switch control device for turning on and off: a first switch of which a first terminal is configured to be connectable to an application terminal for an input voltage, and of which a second terminal is configured to be connectable to a first terminal of an inductor; and a second switch of which a first terminal is configured to be connectable to the first terminal of the inductor and to the second terminal of the first switch, and of which a second terminal is configured to be connectable to an application terminal for a low voltage lower than the input voltage, wherein the switch control device has a first state in which the switch control device keeps the first switch on and the second switch off, a second state in which the switch control device keeps the first switch off and the second switch on, a third state in which the switch control device keeps the first and second switches off, and a fourth state in which the switch control device keeps a voltage at a connection node between the first and second switches lower than in the third state;

the switch control device repeats the first, second, third, and fourth states on a basis of a periodic signal; and the switch control device masks the periodic signal until detecting a zero-crossing point of a current flowing through the inductor.

16. A vehicle-mounted appliance, comprising the switch control device according to claim 15.

17. A vehicle, comprising:

the vehicle-mounted appliance according to claim 16; and a battery for supplying the vehicle-mounted appliance with electric power.

\* \* \* \* \*